US012386291B2

(12) United States Patent
Nihonyanagi

(10) Patent No.: US 12,386,291 B2
(45) Date of Patent: Aug. 12, 2025

(54) IMAGE FORMING SYSTEM AND IMAGE FORMING APPARATUS HAVING EXCHANGEABLE FIXING DEVICES

(71) Applicant: CANON KABUSHIKI KAISHA, Tokyo (JP)

(72) Inventor: Koji Nihonyanagi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/173,398

(22) Filed: Feb. 23, 2023

(65) Prior Publication Data

US 2023/0273551 A1 Aug. 31, 2023

(30) Foreign Application Priority Data

Feb. 28, 2022 (JP) ................................ 2022-029693

(51) Int. Cl.
*G03G 15/20* (2006.01)

(52) U.S. Cl.
CPC ..... *G03G 15/2039* (2013.01); *G03G 15/2042* (2013.01); *G03G 15/2064* (2013.01)

(58) Field of Classification Search
CPC ........... G03G 15/0142; G03G 15/2017; G03G 15/2053; G03G 15/2046; G03G 21/16; G03G 21/1609; G03G 21/1685
See application file for complete search history.

(56) References Cited

U.S. PATENT DOCUMENTS

| | | | | |
|---|---|---|---|---|
| 7,248,807 | B2 * | 7/2007 | Oka | G03G 15/2042 399/33 |
| 9,651,902 | B2 * | 5/2017 | Yamano | G03G 15/2046 |
| 10,921,743 | B2 * | 2/2021 | Inoue | G03G 15/556 |
| 12,242,217 | B2 * | 3/2025 | Fujikawa | G03G 15/2053 |

(Continued)

FOREIGN PATENT DOCUMENTS

| | | |
|---|---|---|
| JP | 2005156688 A | 6/2005 |
| JP | 2011056945 A | 3/2011 |

(Continued)

OTHER PUBLICATIONS

English translation of JP 2005-156688 (Year: 2005).*

*Primary Examiner* — Arlene Heredia
(74) *Attorney, Agent, or Firm* — ROSSI, KIMMS & McDOWELL LLP

(57) ABSTRACT

An image forming system that includes an apparatus main body, equipped with an image forming portion, and a control portion that controls a fixing operation of fixing the image on a recording material is disclosed. A first fixing unit and a second fixing unit can be selectively mounted on the apparatus main body. The first fixing unit has a heater and a plurality of temperature detection elements that detect the temperature of the first heater. The second fixing unit has a second heater and a second plurality of temperature detection elements that detect the temperature of the second heater. The control portion controls the fixing operation based on first temperature information detected by the first temperature detection elements when the first fixing unit is mounted, and controls the fixing operation based on second temperature information detected by the second temperature detection elements when the second fixing unit is mounted.

10 Claims, 16 Drawing Sheets

(56) References Cited

U.S. PATENT DOCUMENTS

| | | | | |
|---|---|---|---|---|
| 2011/0058201 | A1 | 3/2011 | Mueller | |
| 2012/0076510 | A1* | 3/2012 | Mizuno | G03G 21/1685 399/12 |
| 2016/0216653 | A1* | 7/2016 | Yajima | G03G 15/2017 |
| 2019/0235424 | A1* | 8/2019 | Iwasaki | G03G 15/2053 |
| 2019/0250543 | A1* | 8/2019 | Imamiya | G03G 15/2053 |

FOREIGN PATENT DOCUMENTS

| | | | | | |
|---|---|---|---|---|---|
| JP | 4857023 | B2 | * | 1/2012 | |
| JP | 2015225283 | A | | 12/2015 | |
| JP | 2016212381 | A | | 12/2016 | |
| JP | 2023126088 | A | * | 9/2023 | G03G 15/205 |

* cited by examiner

FIXING DEVICE A

FIXING DEVICE B

IMAGE FORMING SYSTEM AND IMAGE FORMING APPARATUS HAVING EXCHANGEABLE FIXING DEVICES

BACKGROUND OF THE INVENTION

Field of the Invention

The present invention relates to an image forming apparatus such as a copier and a printer using electrophotography. The present invention also relates to an image heating device such as a fixing device installed in an image forming apparatus, or a gloss imparting device that improves gloss value of a toner image fixed to a recording material by reheating the toner image.

Description of the Related Art

In an image heating device, such as a fixing device, installed in an image forming apparatus such as a copier and a printer, where a recording material (small size paper) that is narrower than a recording material (large size paper) of the largest size that can be passed through the image forming apparatus is continuously printed, a non-paper-passing portion temperature rise may occur. The non-paper-passing portion temperature rise is a phenomenon in which the temperature gradually rises in a region through which the recording material does not pass in the width direction (the longitudinal direction of the heater) perpendicular to the conveyance direction of the recording material. Where the temperature of the non-paper-passing portion becomes too high, it may damage each part in the apparatus. Therefore, Japanese Patent Application Publication No. 2011-56945 proposes an image forming apparatus in which a fixing unit is unitized and a dedicated fixing unit can be exchanged according to the type and size of the recording material used by the user to perform printing.

SUMMARY OF THE INVENTION

An image forming apparatus is required to perform a fixing operation according to the type of the mounted fixing unit.

An object of the present invention is to provide an image forming apparatus in which a fixing operation can be performed according to the mounted fixing unit.

In order to achieve the above object, the image forming system of the present invention comprises:

an apparatus main body equipped with an image forming portion that forms an image on a recording material; and a control portion that controls a fixing operation of fixing the image formed on the recording material, wherein a first fixing unit having a first heater and a second fixing unit having a second heater different from the first heater can be selectively mounted on the apparatus main body, wherein the first fixing unit has a first number of first temperature detection elements that detect the temperature of the first heater, wherein the second fixing unit has a second number of second temperature detection elements that detect the temperature of the second heater, the second number being smaller than the first number, wherein the control portion controls the fixing operation on the basis of first temperature information detected by the first temperature detection elements in a case where the first fixing unit is mounted, and controls the fixing operation on the basis of second temperature information detected by the second temperature detection elements in a case where the second fixing unit is mounted, wherein the first heater has a plurality of heating blocks that are divided in a width direction perpendicular to a conveyance direction of the recording material, heat generation in each heating block being independently controllable, and wherein the second heater has a single heating block corresponding to the size of the recording material of the largest size in the width direction.

Further, in order to achieve the above object, the image forming system of the present invention comprises:

an apparatus main body equipped with an image forming portion that forms an image on a recording material; and a control portion that controls a fixing operation of fixing the image formed on the recording material, wherein a first fixing unit having a first heater and a second fixing unit having a second heater different from the first heater can be selectively mounted on the apparatus main body, wherein the first fixing unit has a first number of first temperature detection elements that detect the temperature of the first heater, wherein the second fixing unit has a second number of second temperature detection elements that detect the temperature of the second heater, and wherein the control portion determines whether the fixing unit mounted on the apparatus main body is the first fixing unit or the second fixing unit on the basis of the number of temperature detection elements of the heater provided in the fixing unit mounted on the apparatus main body.

Further, in order to achieve the above object, the image forming system of the present invention comprises:

an apparatus main body equipped with an image forming portion that forms an image on a recording material; and a control portion that controls a fixing operation of fixing the image formed on the recording material, wherein a first fixing unit having a first heater and a second fixing unit having a second heater different from the first heater can be selectively mounted on the apparatus main body, wherein the first fixing unit has a first temperature detection element that detects the temperature of the first heater, wherein the second fixing unit has a second temperature detection element that detects the temperature of the second heater, and wherein the control portion determines whether the fixing unit mounted on the apparatus main body is the first fixing unit or the second fixing unit on the basis of the rate of temperature increase of the temperature detected by the temperature detection element of the heater in a case where the heater provided in the fixing unit mounted on the apparatus main body is energized.

Further, in order to achieve the above object, the image forming apparatus of the present invention comprises:

an image forming portion that forms an image on a recording material;

a fixing unit including a heater and a temperature detection element that detects the temperature of the heater; and a control portion that controls the fixing operation of fixing the image on the recording material, wherein the control portion determines the type of the fixing unit on the basis of the number of the temperature detection elements included in the fixing unit.

Further, in order to achieve the above object, the image forming apparatus of the present invention comprises:

an apparatus main body equipped with an image forming portion that forms an image on a recording material; and a fixing unit that includes a heater and a temperature detection element detecting the temperature of the heater and that is mounted on the apparatus main body, wherein the apparatus main body is equipped with a first number of connection portions, wherein the fixing unit is equipped with a second number of the temperature detection elements, and wherein the first number is greater than the second number, and some of the first number of connection portions are connected to the second number of temperature detection elements.

According to the present invention, it is possible to provide an image forming apparatus in which a fixing operation can be performed according to the mounted fixing unit.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

Configuration of Image Forming Apparatus

Figure 1:
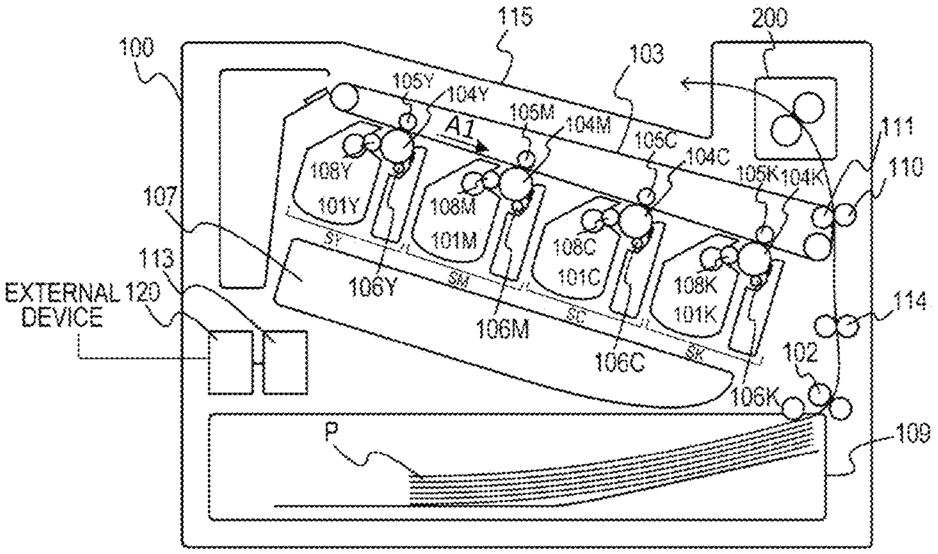
FIG. 1 is a schematic cross-sectional view of an image forming apparatus.

FIG. 1 is an exemplary configuration diagram of an electrophotographic image forming apparatus in the present embodiment. Examples of image forming apparatuses to which the present invention can be applied include copiers and printers using an electrophotographic method or an electrostatic recording method. Here, a case of application to a laser printer in which an image is formed on a recording material P using an electrophotographic method will be described. In the present embodiment, a so-called tandem-type color laser printer using toners of four colors (yellow (Y), magenta (M), cyan (C), and black (K)) is exemplified, but the type of image forming apparatus to which the present invention can be applied is not limited to this. For example, the present invention can also be applied to a monochrome printer having a single image forming unit.

An image forming apparatus 100 includes a video controller 120 and a control portion 113. The video controller 120 functions as an acquisition unit that acquires information about an image to be formed on a recording material and receives and processes image information and print instructions transmitted from an external device such as a host computer. The control portion 113 is connected to the video controller 120 and controls each unit constituting the image forming apparatus according to instructions from the video controller 120.

The image forming apparatus 100 has image forming stations SY, SM, SC, and SK as image forming portions for each color. As an example, the yellow image forming station SY is configured of a process cartridge 101Y including a photosensitive drum 104Y, a charging roller 106Y, and a developing roller 108Y, an intermediate transfer belt 103, and a primary transfer roller 105Y arranged opposite to the process cartridge 101Y with the intermediate transfer belt 103 interposed therebetween. Further, the magenta image forming station SM is configured of a process cartridge 101M including a photosensitive drum 104M, a charging roller 106M, and a developing roller 108M, the intermediate transfer belt 103, and a primary transfer roller 105M arranged opposite to the process cartridge 101M with the intermediate transfer belt 103 interposed therebetween. The cyan image forming station SC is configured of a process cartridge 101C including a photosensitive drum 104C, a charging roller 106C, and a developing roller 108C, the intermediate transfer belt 103, and a primary transfer roller 105C arranged opposite to the process cartridge 101C with the intermediate transfer belt 103 interposed therebetween. Further, the black image forming station SK is configured of a process cartridge 101K including a photosensitive drum 104K, a charging roller 106K, and a developing roller 108K, the intermediate transfer belt 103, and a primary transfer roller 105K arranged opposite to the process cartridge 101K with the intermediate transfer belt 103 interposed therebetween. The intermediate transfer belt 103 rotates in the arrow A1 direction shown in the figure, and the image forming stations SY, SM, SC, and SK are arranged side by side in the rotation direction of the intermediate transfer belt 103 and are substantially the same, except that colors to be formed are different. Accordingly, symbols Y, M, C, and K indicating that the elements are provided for any one of the colors will be omitted and a general description will be given below, unless a particular distinction is required.

The process cartridge 101 has the photosensitive drum 104 as an image bearing member. The photosensitive drum 104 is driven to rotate clockwise by a driving unit (not shown). The charging roller 106 uniformly charges the surface of the photosensitive drum 104 as a result of high voltage application from a high voltage power source (not shown). Next, a scanner unit 107 as an exposure unit irradiates the photosensitive drum 104 with laser radiation on the basis of image information input to the video controller 120 to form an electrostatic latent image on the surface of the photosensitive drum 104. A developing roller 108 as a developer supply member is rotated counterclockwise by a driving unit (not shown), and a toner as a charged developer coated on the surface adheres along the electrostatic latent image on the surface of the photosensitive drum 104, whereby the electrostatic latent image becomes a visible image. A visible image formed by toner is hereinafter referred to as a toner image. The base layer of the photosensitive drum 104 is grounded, and a voltage opposite in polarity to that of the toner is applied to a primary transfer roller 105 by a high voltage power source (not shown). Therefore, a transfer electric field is formed at a nip between the primary transfer roller 105 and the photosensitive drum 104, and the toner image is transferred from the photosensitive drum 104 to the intermediate transfer belt 103.

As shown in FIG. 1, the intermediate transfer belt 103 rotates in the direction indicated by the arrow A1, so that the toner images generated at the image stations S of each color are formed on the intermediate transfer belt 103 and conveyed. Recording materials P are stacked and stored in a paper feed cassette 109. Where the video controller 120 receives a print instruction from an external device, the image forming apparatus 100 feeds the recording material P with a feeding roller 102 and conveys the recording material toward the intermediate transfer belt 103. The recording material P is conveyed at a predetermined timing to a contact nip portion formed between a secondary transfer roller 110 and a secondary transfer counter roller 111 (intermediate transfer belt 103) with a pair of registration rollers 114 interposed therebetween. Specifically, the conveyance is performed at the timing when the leading edge portion of the toner image on the intermediate transfer belt 103 overlaps with the leading edge of the recording material P. While the recording material P is nipped and conveyed between the secondary transfer roller 110 and the secondary transfer counter roller 111, a voltage opposite in polarity to that of the toner is applied to the secondary transfer roller 110 from a power supply device (not shown). Since the secondary transfer counter roller 111 is grounded, a transfer electric field is formed between the secondary transfer roller 110 and the secondary transfer counter roller 111. The toner image is transferred from the intermediate transfer belt 103 to the recording material P by this transfer electric field. After passing through the nip between the secondary transfer roller 110 and the secondary transfer counter roller 111, the recording material P is subjected to heat treatment using heat from a heater and pressure treatment by the fixing nip in a fixing apparatus 200. As a result, the toner image on the recording material P is fixed on the recording material P. After that, the recording material P is conveyed to the discharge tray 115, and the image forming process is completed.

The control portion 113 has a storage portion that stores a temperature control program for the fixing apparatus 200.

Here, in the present embodiment, the operation of forming a fixed image on the recording material, that is, the combination of the operation of forming an unfixed toner image on the recording material P by each image station and the operation of fixing the toner image on the recording material P by the fixing apparatus 200, is considered as the image forming operation.

In the present embodiment, an image forming apparatus having the largest paper passing width of 216 mm in the width direction orthogonal to the conveyance direction of the recording material P is used, and printing can be performed on a Letter size (216 mm×279 mm) recording material.

The image forming apparatus 100 of the present embodiment is configured such that one of a plurality of types of fixing apparatuses (fixing units) 200 having mutually different configurations (types) can be selectively mounted on the apparatus main body. Although two types of fixing apparatuses 200 (fixing device A and fixing device B) will be described in the present embodiment, three or more types of fixing apparatuses 200 may be detachably attached.

Configuration of Fixing Device A

Figure 2:
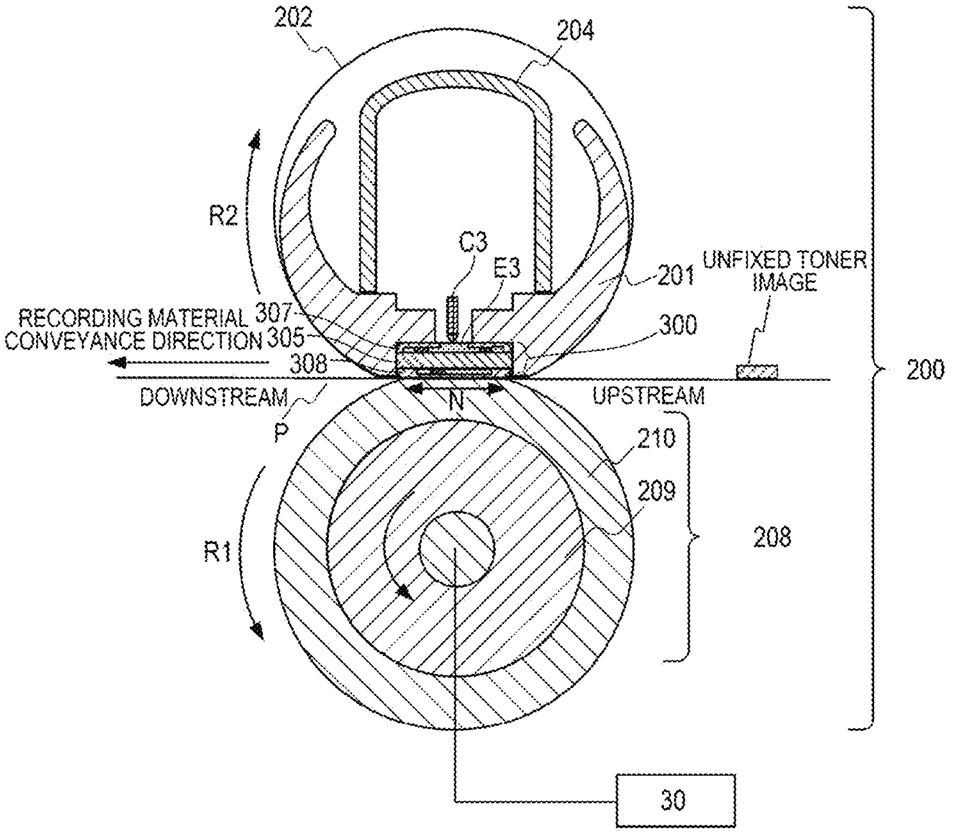
FIG. 2 is a schematic cross-sectional view of a fixing device A.

FIG. 2 is a cross-sectional view of the fixing device A (first fixing unit) which is the first fixing device. The fixing device A has a fixing film 202 as an endless belt, a heater 300 that contacts the inner surface of the fixing film 202, a pressure roller 208 that forms a fixing nip portion N together with the heater 300, with the fixing film 202 interposed therebetween, and a metal stay 204.

The fixing film 202 is a multilayer heat-resistant film formed in a cylindrical shape, and a heat-resistant resin such as a polyimide having a thickness of from about 50 μm to about 100 μm or a metal such as stainless steel having a thickness of from about 20 μm to about 50 μm can be used as a base layer. In addition, a release layer is formed on the surface of the fixing film 202 in order to prevent toner from adhering and to ensure separability from the recording material P. The release layer is formed by coating a heat-resistant resin having a thickness of from about 10 μm to about 50 μm, such as a tetrafluoroethylene-perfluoroalkyl vinyl ether copolymer (PFA), which has excellent release properties. Further, particularly in an apparatus for forming color images, a heat-resistant rubber such as silicone rubber having a thickness of from about 100 μm to about 400 μm and a thermal conductivity of from about 0.2 W/m·K to about 3.0 W/m·K may be provided as an elastic layer between the base layer and the release layer to improve image quality. In the present embodiment, from the viewpoint of thermal responsiveness, image quality, durability, and the like, a polyimide with a thickness of 60 μm is used as the base layer, silicone rubber with a thickness of 300 μm is used as the elastic layer, and PFA with a thickness of 30 μm is used as the release layer.

The pressure roller 208 has a metal core 209 made of a material such as iron, aluminum or the like, and an elastic layer 210 made of silicone rubber or the like. The heater 300 is held by a heater holding member 201 made of heat-resistant resin and heats the fixing film 202. The heater holding member 201 also has a guide function of guiding the rotation of the fixing film 202. The metal stay 204 receives a pressure force (not shown) to urge the heater holding member 201 toward the pressure roller 208. The pressure roller 208 receives power from a motor 30 and rotates in the direction of arrow R1. The fixing film 202 is driven by the rotation of the pressure roller 208 and rotates in the direction of arrow R2. By applying heat from the fixing film 202 while nipping and conveying the recording material P in the fixing nip portion N, the unfixed toner image on the recording material P is fixed.

The heater 300 is heated by a heating element provided on a ceramic substrate 305. The heater 300 is provided with a surface protective layer 308 provided on the fixing nip portion N side and a surface protective layer 307 provided on the opposite side of the fixing nip portion N. A plurality of electrodes (an electrode E3 is shown herein as a representative) provided on the opposite side of the fixing nip portion N and a plurality of electrical contacts (an electrical contact C3 is shown herein as a representative) are provided. Power is supplied to each electrode from the respective electrical contact.

Heater Configuration of Fixing Device A

Figure 3A:
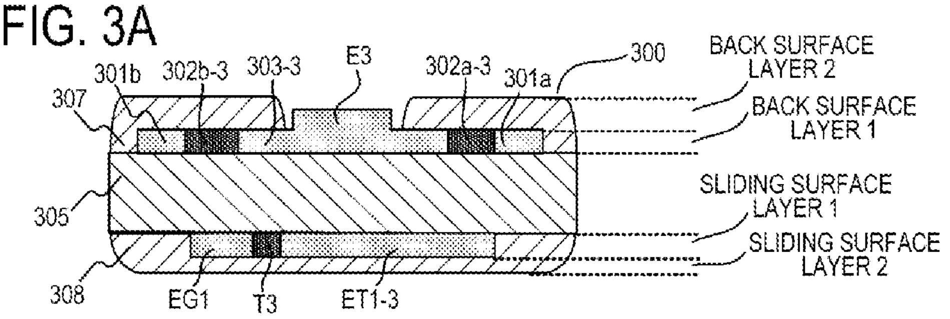
FIGS. 3A to 3C are configuration diagrams of a heating heater.
Figure 3B:
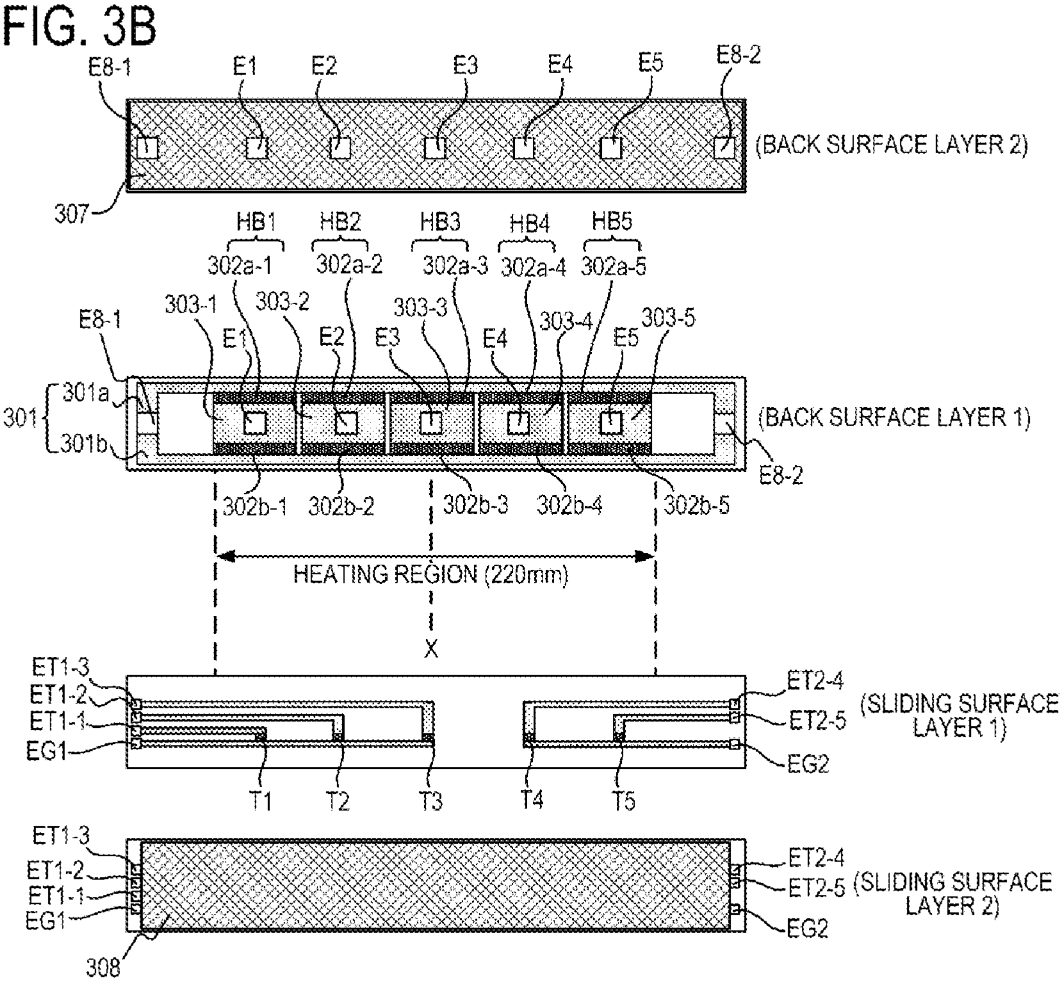
Figure 3C:
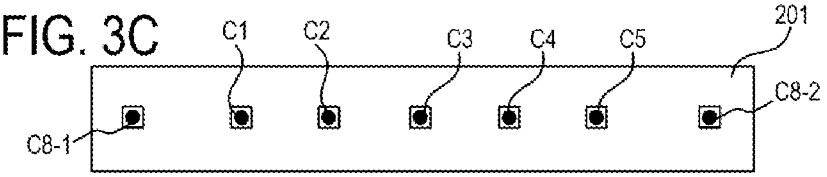

FIGS. 3A to 3C show configuration diagrams of the heater 300 of the fixing device A. FIG. 3A shows a cross-sectional view at a conveyance reference position X shown in FIG. 3B. The conveyance reference position X is defined as a reference position when the recording material P is conveyed. In the present embodiment, the central portion of the recording material P in the width direction is conveyed so as to pass through the conveyance reference position X.

The size of the substrate 305 made of alumina is 230 mm in the longitudinal direction, 8 mm in the width direction, and 1 mm in thickness. A first conductor 301 (301*a*, 301*b*) and second conductors 303 are provided on the surface of the substrate 305 on the back surface layer side. The first conductor 301 is provided on the substrate 305 along the longitudinal direction of the heater 300. The second conductors 303 (303-3 at the conveyance reference position X) are provided on the substrate 305 along the longitudinal direction of the heater 300 at different positions in the lateral direction of the first conductor 301 and the heater 300. The first conductor 301 is separated into a conductor 301*a* arranged on the upstream side in the conveyance direction of the recording material P and a conductor 301*b* arranged on the downstream side.

Furthermore, the heater 300 has heating elements 302 that are provided between the first conductor 301 and the second conductors 303 and generate heat under power supplied through the first conductor 301 and the second conductors 303. In the present embodiment, the heating elements 302 are separated into heating elements 302*a* (302*a*-3 at the conveyance reference position X) arranged on the upstream side in the conveyance direction of the recording material P and heating elements 302*b* (302*b*-3 at the conveyance reference position X) arranged on the downstream side. Further, an insulating (glass in the present embodiment) surface protective layer 307 that covers the heating elements 302, the first conductors 301, and the second conductors 303 (303-3 at the conveyance reference position X) is provided on the back surface layer 2 of the heater 300 so as to avoid an electrode portion E (E3 at the conveyance reference position X). Further, the conductors 301, the conductors 303, and the heating elements 302 are all screen-printed with a thickness of 10 μm.

A plan view of each layer of the heater 300 is shown in FIG. 3B. In the back surface layer 1 of the heater 300, a plurality of heating blocks each including a set of the first conductor 301, the second conductor 303 and the heating element 302 are provided in the longitudinal direction of the heater 300. The heater 300 of the present embodiment has a total of five heating blocks HB1 to HB5 in the longitudinal direction of the heater 300. A heating region extends from the left end of the heating block HB1 in the figure to the right end of the heating block HB5 in the figure, and has a length of 220 mm. The heating blocks HB1 to HB5 are configured of heating elements 302*a*-1 to 302*a*-5 and heating elements 302*b*-1 to 302*b*-5, respectively, which are formed symmetrically in the lateral direction of the heater 300. The first conductor 301 in the back surface layer 1 is configured of the conductor 301*a* connected to the heating elements (302*a*-1 to 302*a*-5) and the conductor 301*b* connected to the heating elements (302*b*-1 to 302*b*-5). Similarly, the second conductor 303 is divided into five conductors 303-1 to 303-5 to correspond to the five heating blocks HB1 to HB5.

The electrodes E1 to E5 are used to supply electric power to the heating blocks HB1 to HB5 through conductors 303-1 to 303-5, respectively. Electrodes E8-1 and E8-2 are used to connect to a common electrical contact used to supply power to five heating blocks HB1 to HB5 through conductors 301*a* and 301*b*. In the present embodiment, the electrodes E8-1 and E8-2 are provided at both ends in the longitudinal direction, but a configuration may be used in which, for example, only the electrode E8-1 is provided on one side, or separate electrodes may be provided upstream and downstream in the recording material conveyance direction.

Also, the surface protective layer 307 is formed on the back surface layer 2 of the heater 300, except the locations of the electrodes E1 to E5, E8-1 and E8-2. With this configuration, electrical contacts C1 to C5, C8-1, and C8-2 can be connected to the respective electrodes from the back surface layer side of the heater 300, and electric power can be supplied from the back surface layer side of the heater 300. Further, in this configuration, the power supplied to at least one of the heating blocks and the power supplied to the other heating blocks can be independently controlled. Providing electrodes on the back surface of the heater 300, makes it unnecessary to perform wiring with a conductive pattern on the substrate 305, so that the width of the substrate 305 in the lateral direction can be shortened. Therefore, it is possible to obtain the effect of reducing the material cost of the substrate 305 and shortening the start-up time required for the temperature rise of the heater 300 due to the reduction of the heat capacity of the substrate 305. The electrodes E1 to E5 are provided within a region in which the heating elements are provided in the longitudinal direction of the substrate.

A sliding surface layer 2 on the sliding surface side (the surface on the side in contact with the fixing film) of the heater 300 has a surface protective layer 308 (glass in the present embodiment) having a sliding property. The surface protective layer 308 is provided at least in a region where the fixing film 202 slides, except for both end portions of the heater 300. At both end portions of the heater 300, which are not covered with the surface protective layer 308, electrical contacts are provided at conductors ET1-1 to ET1-3 and ET2-4 to ET2-5 for detecting the resistance value of thermistors and common conductors EG1 and EG2 of the thermistors. In a sliding surface layer 1, thermistors T1 to T5 formed by thinly applying a material having a PTC characteristic or an NTC characteristic (NTC characteristic in the present embodiment) to the substrate are installed as temperature detection elements for detecting the temperature of each of the heating blocks HB1 to HB5 of the heater 300. Since all the heating blocks HB1 to HB5 have thermistors, the temperatures of all the heating blocks can be detected by detecting the resistance values of the thermistors.

As shown in FIG. 3C, the holding member 201 of the heater 300 is provided with holes for connecting the electrodes E1, E2, E3, E4, E5, E8-1, and E8-2 and electrical contacts C1 to C5, C8-1, and C8-2. The aforementioned electrical contacts C1 to C5, C8-1 and C8-2 are provided between the stay 204 and the holding member 201. The electrical contacts C1 to C5, C8-1, and C8-2 contacting the electrodes E1 to E5, E8-1, and E8-2 are electrically connected to the respective electrode portions of the heater by means of biasing by springs, welding, or the like. Each electrical contact is connected to a control circuit 600 of the heater 300, which will be described hereinbelow, through a conductive material such as a cable or thin metal plate provided in the space between the stay 204 and the holding member 201. In addition, the electrical contacts provided for the conductors ET1-1 to ET1-3 and ET2-4 to ET2-5 for detecting the resistance value of the thermistors and the common conductors EG1 and EG2 of the thermistors are also connected to the control circuit 600, which will be described hereinbelow.

Configuration of Fixing Device B

Figure 4:
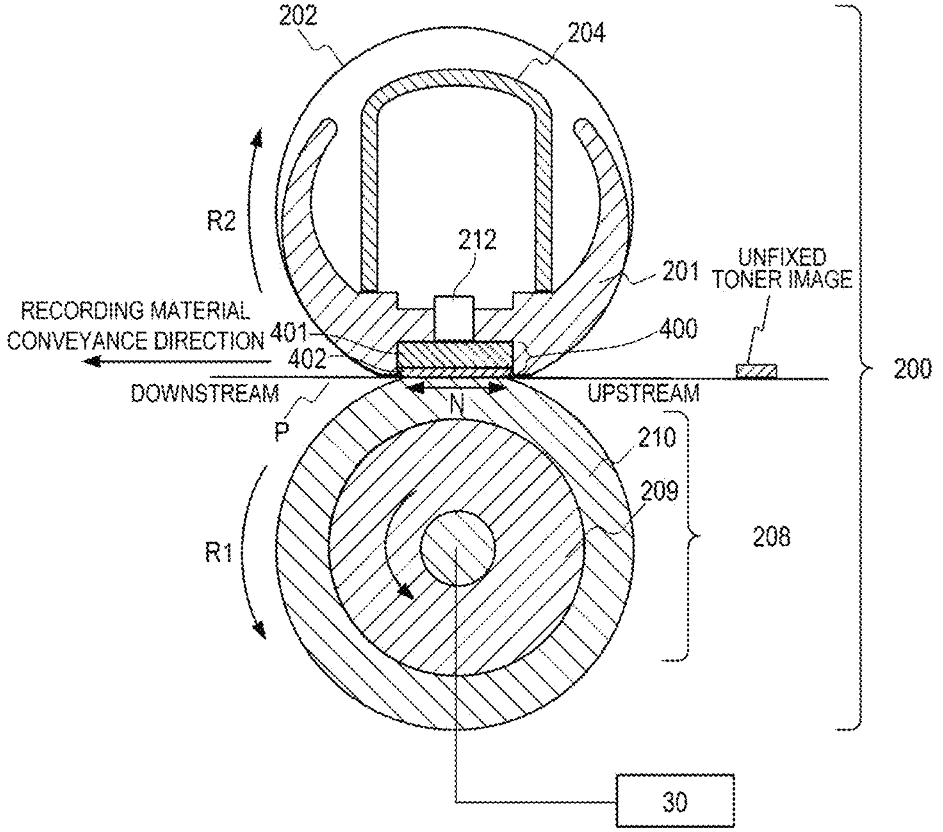
FIG. 4 is a schematic cross-sectional view of a fixing device B.

FIG. 4 is a cross-sectional view of the fixing device B (second fixing unit), which is the second fixing device used in the present embodiment. The difference from the fixing device A in FIG. 2 is in the heater, and the rest of the configuration is the same, so the description thereof is omitted. A heater 400 of the fixing device B is heated by a heating element provided on a ceramic substrate 401. The heater 400 is provided with a surface protective layer 402 on the fixing nip portion N side. An electrode and an electrical contact (not shown) are provided on the opposite side of the fixing nip portion N, and power is supplied to the electrode from the electrical contact. A detailed explanation of the heater 400 will be provided with reference to FIG. 5. A thermistor 212 as a temperature detection element for detecting the temperature of the heater 400 is in direct contact with the heater 400.

Heater Configuration of Fixing Device B

Figure 5A:
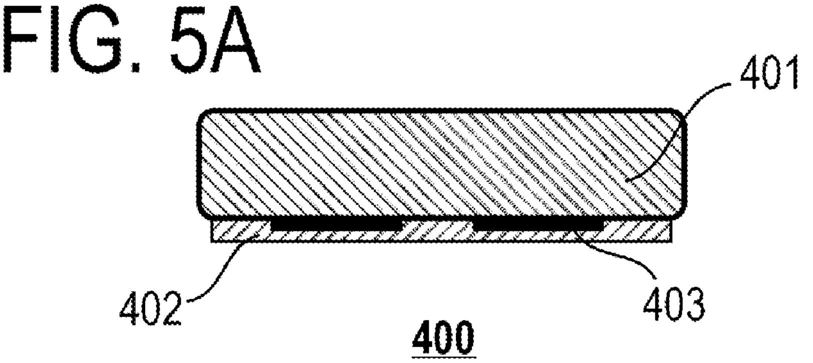
FIGS. 5A and 5B are configuration diagrams of a heating heater.
Figure 5B:
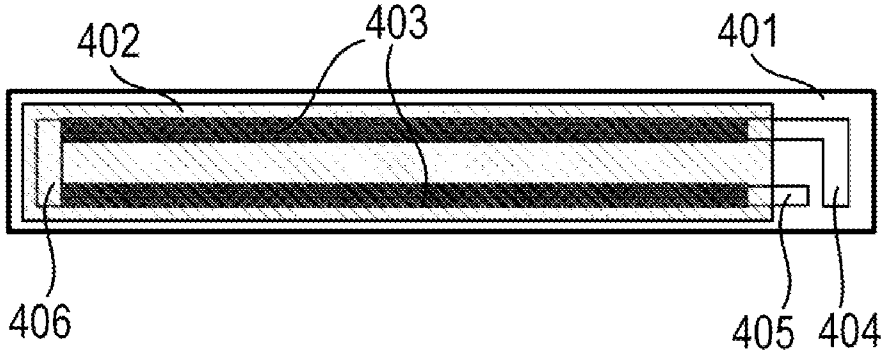

FIGS. 5A and 5B show configuration diagrams of the heater 400 of the fixing device B. FIG. 5A is a cross-sectional view of the heater 400. The size of an alumina substrate 401 is 230 mm in the longitudinal direction, 8 mm in the width direction, and 1 mm in thickness, and a heating element 403 is screen-printed with a thickness of 10 μm. The surface protective layer 402 made of glass is screen-printed with a thickness of 50 μm. Further, FIG. 5B is a plan view of the heater 400 as viewed from the fixing nip portion N side. Conductive patterns 404 and 405 are formed as electrodes on the end portion of the alumina substrate 401. In the heating element 403, two heating elements are connected in series through a conductive pattern 406. The heating element 403 is heated by supplying power to the conductive patterns 404 and 405.

Configuration of Heater Control Circuit

Figure 6:
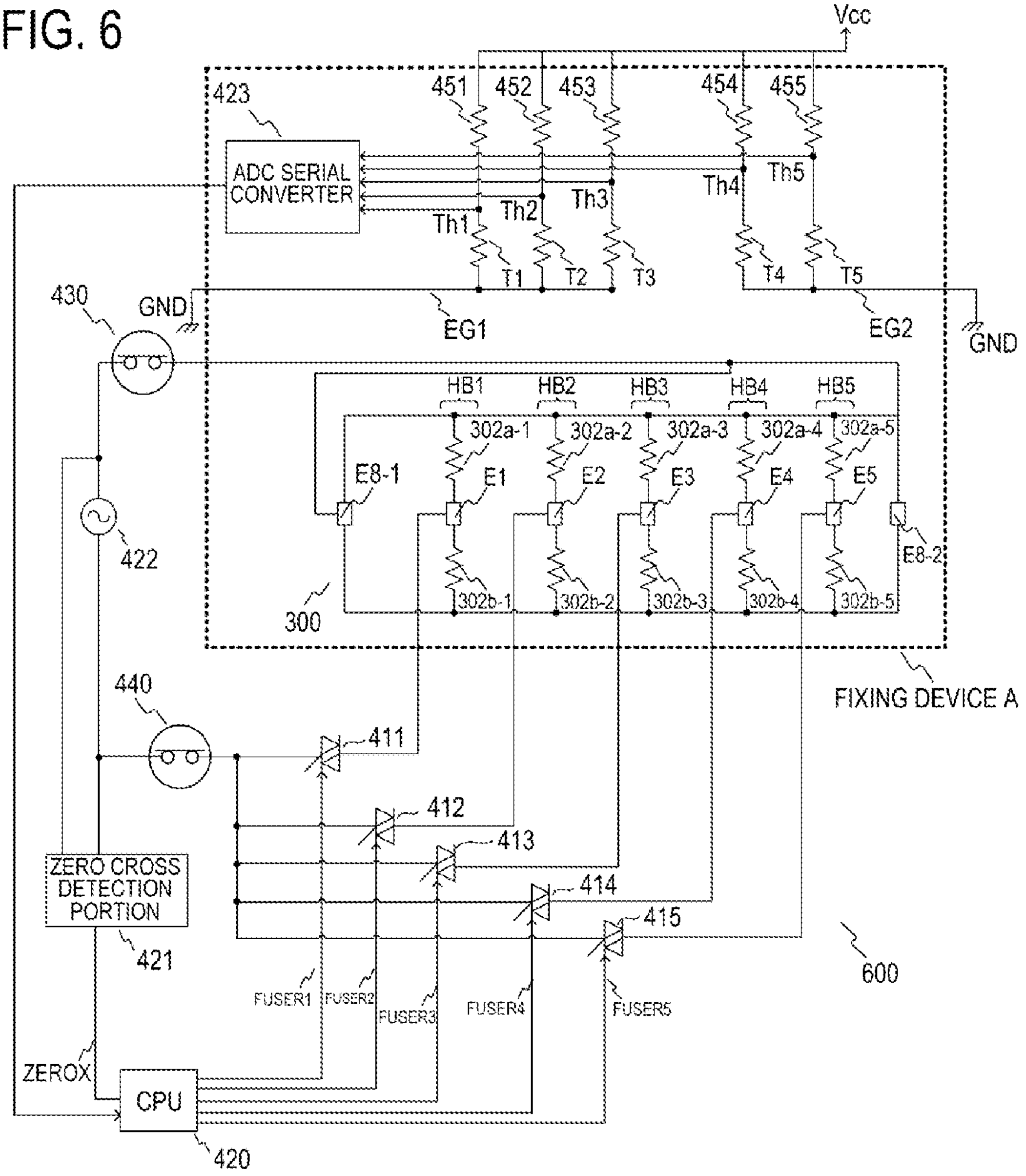
FIG. 6 is an electric circuit configuration diagram of Embodiment 1.

FIG. 6 is a circuit diagram of the control circuit of the fixing device in the present embodiment, this circuit diagram relating to the case where the fixing device A is mounted on the image forming apparatus. A portion surrounded by a dashed line in FIG. 6 shows a circuit diagram of the fixing device A. A CPU 420 is a part of a control portion 113 of the image forming apparatus and serves to drive the control circuit. Control of power from a commercial AC power supply 422 connected to the image forming apparatus 100 to the heater 300 is performed by energizing/interrupting triacs 411 to 415, which are semiconductor switching elements. The triacs 411 to 415 operate according to FUSER1 to FUSER5 signals from CPU 420, respectively. The drive circuits for the triacs 411 to 415 are not shown. The control circuit of the heater 300 has a circuit configuration capable of independently controlling five heating blocks HB1 to HB5 by five triacs 411 to 415.

A zero cross detection portion 421 is a circuit that detects the zero cross of the AC power supply 422 and outputs a ZEROX signal to the CPU 420. The ZEROX signal is used for detection etc. of timing for phase control or wave number control of the triacs 411 to 415.

Next, a method for detecting the temperature of the heater 300 will be explained. The temperatures detected by the thermistors T1 to T5 are represented by divided voltages of the thermistors T1 to T5 and resistors 451 to 455 that are detected by an AD converter 423 as Th1 to Th5 signals. The AD converter 423 discretizes the Th1 to Th5 analog voltage signals, converts them into digital signals, and transmits the digital information as temperature information to the CPU 420 by serial communication.

In the internal processing of the CPU 420, the power to be supplied is calculated by, for example, PI (proportional/integral) control on the basis of the set temperature of each heating block and the detected temperature of the thermistors. Then conversion is performed to the control level of phase angle (phase control) and wave number (wave number control) corresponding to the power to be supplied, and the triacs 411 to 415 are controlled according to the control conditions. A relay 430 and a relay 440 are used as means for interrupting power to the heater 300 when the temperature of the heater 300 is excessively increased due to failure or the like.

Figure 7:
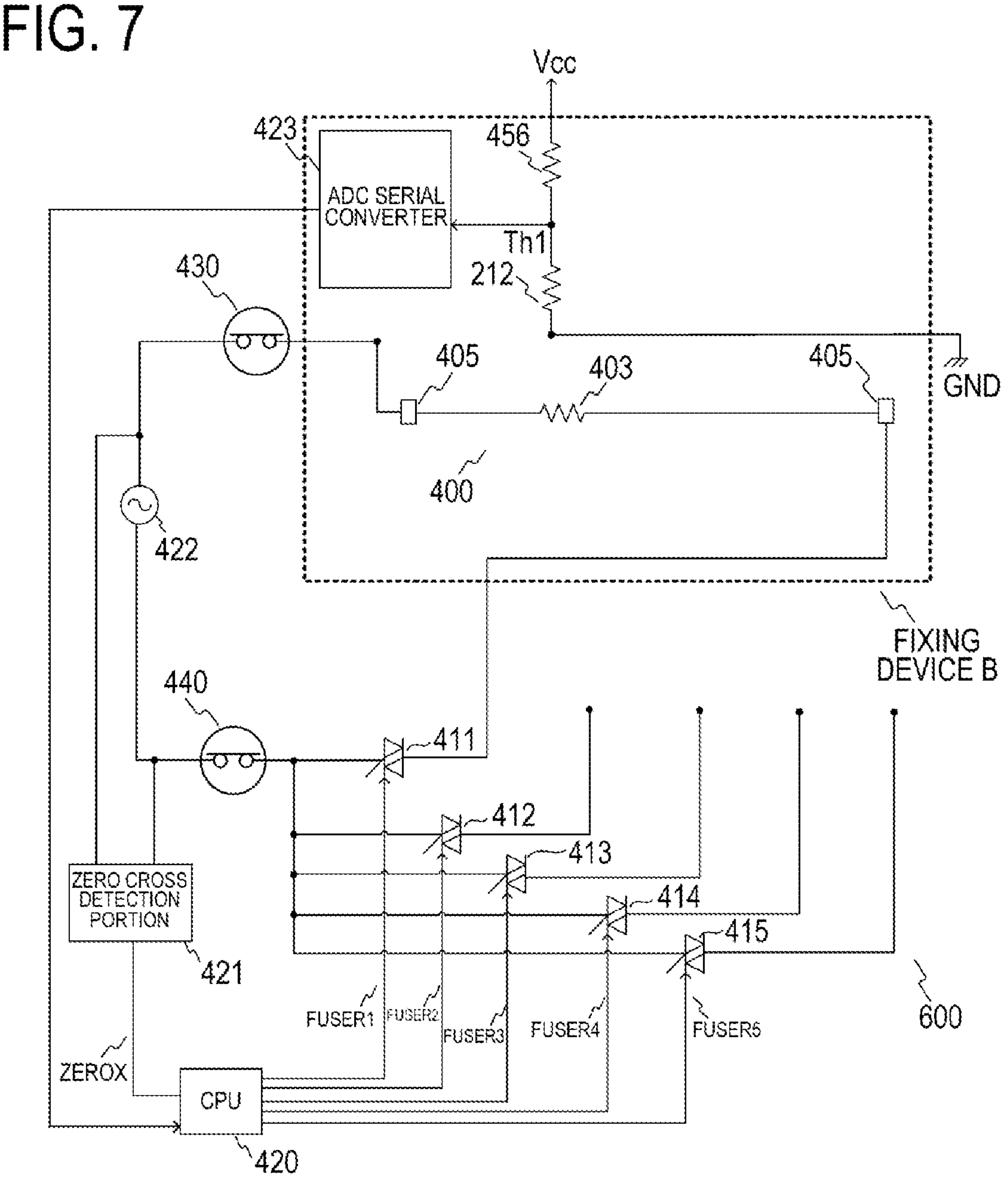
FIG. 7 is an electric circuit configuration diagram of Embodiment 1.

FIG. 7 is a circuit diagram of the control circuit of the fixing device in the present embodiment, this circuit diagram relating to the case where the fixing device B is mounted on the image forming apparatus. A portion surrounded by a dashed line in FIG. 7 shows a circuit diagram of the fixing device B. Power control of the heater 400 of the fixing device B is performed by energizing/interrupting the triac 411. The triac 411 operates according to the FUSER1 signal from the CPU 420. Since the heater 400 has only one system of the heating element 403, the triacs 412 to 415 are not connected to (insulated from) the fixing device B. A method for detecting the temperature of the heater 400 is based on the detection by the thermistor 212. The temperature detected by the thermistor 212 is represented by a divided voltage of the thermistor 212 and the resistor 456 that is detected by the AD converter 423 as a Th1 signal. The AD converter 423 discretizes the Th1 analog voltage signal, converts it into a digital signal, and transmits the digital information as temperature information to the CPU 420 by serial communication. Since other features of the control circuit configuration are the same as those in FIG. 6, description thereof will be omitted.

Outline of Heater Control Method

The image forming apparatus of the present embodiment executes an image forming operation with different control contents depending on the type of fixing unit mounted on the apparatus main body.

The heater 300 of the fixing device A as the first fixing unit has a plurality of heating blocks that are divided in the width direction perpendicular to the conveyance direction of the recording material P, heat generation in each heating block being independently controllable. Meanwhile, the heater 400 of the fixing device B as the second fixing unit is configured to have a single heating block corresponding to the size of the recording material of the largest size in the width direction. In the fixing device A, the control target temperature is individually set for each of the plurality of heating blocks according to the size of the recording material P passing through the fixing device A. For example, when the recording material of the largest size passes through the fixing device A, the control target temperature may be set to the same temperature for each of the plurality of heating blocks. For example, when fixing a recording material narrower than the largest size, the control target temperature of the heating blocks at the ends in the width direction may be set to a temperature lower than the control target temperature of the heating block on the inner side in the width direction with respect to those heating blocks. The specific control contents will be described below.

In the configuration in which the fixing device A is mounted, the power supplied to each of the five heating blocks HB1 to HB5 of the heater 300 is optimally controlled to perform selective heating according to the printing conditions sent from an external device (not shown) such as a host computer. The power to be supplied to each of the heating blocks HB1 to HB5 is determined by the control portion 113 with reference to a control target temperature (hereinafter referred to as control temperature TgtA) as a heating parameter for each of the heating blocks HB1 to HB5.

Temperature control is performed such that temperatures detected by the thermistors T1 to T5 corresponding to the heating blocks HB1 to HB5 become equal to the control temperature TgtA set for the respective heating blocks HB1 to HB5.

Where the fixing device B is mounted on the image forming apparatus, power is supplied to the heating element 403 of the heater 400 according to printing conditions sent from an external device (not shown) such as a host computer. The power to be supplied is determined by the control portion 113 with reference to a control target temperature (hereinafter referred to as control temperature TgtB) as a heating parameter for the heating element 403.

Also, the temperature is controlled so that the detected temperature of the thermistor 212 becomes equal to the control temperature TgtB set for the heater 400.

Here, the control temperature TgtA of the fixing device A and the control temperature TgtB of the fixing device B have different values. The reason is that in the fixing device A, the thermistors T1 to T5 are installed between the ceramic substrate 305 and the fixing film 202, whereas in the fixing device B, the thermistor is installed is on the back surface (side opposite to the fixing film) of the ceramic substrate 401. In other words, when the fixing nip portion N is set to an optimum temperature in order to heat and fix the unfixed toner on the recording material P, the thermistors T1 to T5 in the fixing device A are set at positions close to the fixing nip portion N and therefore detect relatively high temperatures. Meanwhile, in the fixing device B, even if the temperature of the fixing nip portion N is the same, since the thermistor 212 is installed at a position distant from the fixing nip portion N, a relatively low temperature is detected. For this reason, in the present embodiment, the control temperature TgtA is set higher than the control temperature TgtB.

Print Speed Control for Each Paper Size

The types of recording materials that can be passed through the image forming apparatus of the present embodiment include Letter paper (width of 216 mm) as a recording material of the largest width (large size paper), and Executive paper (width of 184 mm), which is a recording material with a narrower width. The control of the number of sheets printed per minute (hereinafter referred to as throughput), which is the number of sheets that pass through the fixing device per unit time when continuously printing a plurality of sheets of each of the Letter paper and Executive paper, will be described hereinbelow.

When the fixing device A is mounted on the image forming apparatus, printing can be performed with the same throughput on both Letter paper and Executive paper by changing the control temperature of the heating blocks HB1 to HB5 for each paper size. In this case, where printing is on Letter paper, since the paper passes through the entire length of the heating blocks HB1 to HB5, good fixing performance can be obtained by setting all the heating blocks to the same control temperature. Meanwhile, when printing on Executive paper, the region through which the paper passes is the heating blocks HB2 to HB4 (the length of the heating blocks HB2 to HB4 is 188 mm), and the heating blocks HB1 and HB5 are non-paper-passing regions through which the paper does not pass. Where all the control temperatures of the heating blocks HB1 to HB5 are set to the same temperature, the temperature in the regions of the heating blocks HB1 and HB5 will be higher than in the other regions, possibly exceeding the heat resistance temperature of the fixing film. Therefore, in the present embodiment, the control temperature of the heating blocks HB1 and HB5 (first heating blocks) when passing Executive paper is set to a temperature lower than the control temperature of the heating blocks HB2 to HB4 (second heating blocks). By doing so, it is possible to print with the same throughput as Letter paper as described above.

Table 1 shows the control temperature (predetermined control target temperature) of the heating blocks when printing Letter paper and Executive paper at a throughput of 50 ppm (pages per minute).

TABLE 1

| Control Temperature of Fixing Device A | | |
|---|---|---|
| Paper size | Control temperature of HB1 and HB5 | Control temperature of HB2 to HB4 |
| Letter | 220° C. | 220° C. |
| Excecutive | 180° C. | 220° C. |

Figure 8A:
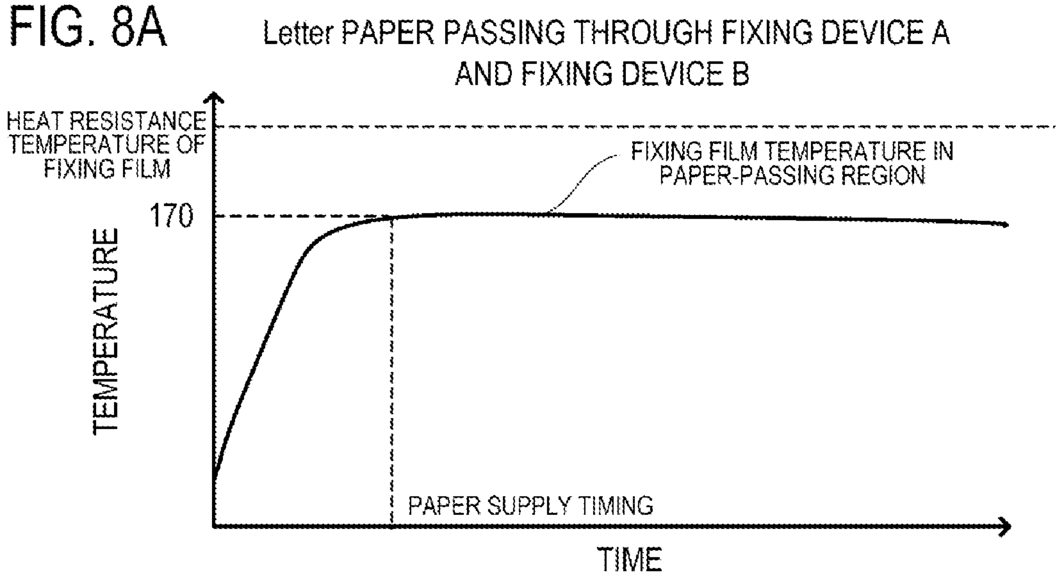
FIGS. 8A and 8B are diagrams showing the temperature transition of the fixing film of Embodiment 1.
Figure 8B:
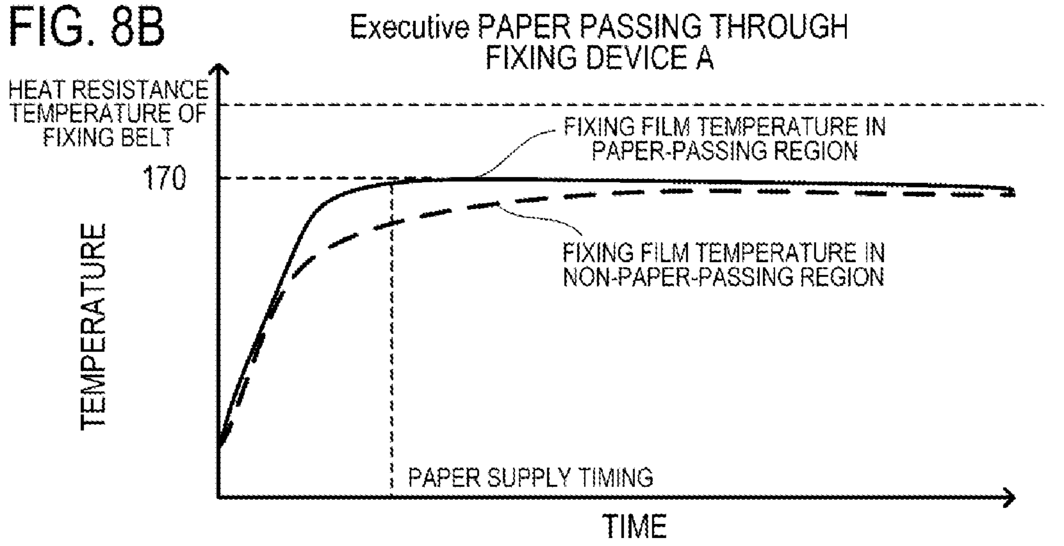

FIGS. 8A and 8B each show the temperature transition of the fixing film when printing. FIG. 8A shows the case where printing is on Letter paper, the heating blocks HB1 to HB5 are all paper passing regions, and the surface temperature of the fixing film in the paper passing regions is constant at 170° C. and maintained at or below the heat resistance temperature. Meanwhile, FIG. 8B shows the case where printing is on Executive paper, and the film temperature in the paper passing region indicated by the solid line is the same as that in FIG. 8A. Further, the heating blocks HB1 and HB5 become non-paper-passing regions, and as a result of setting the control temperature of the heating blocks HB1 and HB5 to a low temperature of 180° C., the transition in film temperature in the non-paper-passing regions indicated by the dashed lines proceeds at a lower temperature at the initial stage of printing. However, the temperature rises gradually due to the non-paper-passing portion temperature rise, and finally reaches the same level as the film temperature in the paper passing portion. In addition, the fixing film temperature is maintained below the heat resistance temperature in all regions.

When the fixing device B is mounted on the image forming apparatus, the control target temperature of the heater 400 is set to one temperature regardless of the paper size.

Table 2 shows the control temperature of the heater 400 and the throughput set for each paper size when printing on Letter paper and Executive paper.

TABLE 2

| Control Temperature of Fixing Device B and Throughput | | |
|---|---|---|
| Paper size | Control temperature of heater 400 | Throughput |
| Letter | 200° C. | 50 ppm |
| Excecutive | 200° C. | 20 ppm |

As described above, the control temperature of the fixing device A is set higher than the control temperature of the fixing device B in the paper passing region. For example, the control temperature of the heating blocks HB2 to HB4 of the fixing device A, which is the paper passing region when printing on Executive paper, is set to a temperature (220° C.) higher than the control temperature (200° C.) of the fixing device B. Meanwhile, the control temperatures of the heating blocks HB1 and HB5 of the fixing device A, which are non-paper-passing regions when printing on Executive paper, are set to a temperature (180° C.) lower than the control temperature (200° C.) of the fixing device B.

The temperature transition of the fixing film when printing on Letter paper at 50 ppm is shown in FIG. 8A, and it is exactly the same as the temperature transition of the fixing device A. Next, when printing on Executive paper at 20 ppm, the recording material conveyance speed is set to be the same as for Letter paper, but the interval at which the recording material is supplied is extended to process 20 sheets per minute. Also, the control temperature of the heater 400 is set to the same temperature as Letter paper. By setting the throughput to 20 ppm, the time during which the recording material is not nipped in the fixing nip portion N (hereinafter referred to as the paper interval) becomes longer. Since the heat generated by the heater is not supplied to the paper in the paper interval, the heater temperature can be controlled to 200° C. with less electric power. Therefore, since the electric power supplied to the non-paper-passing portion is also small in the paper interval, the non-paper-passing portion temperature rise is suppressed.

Figure 9A:
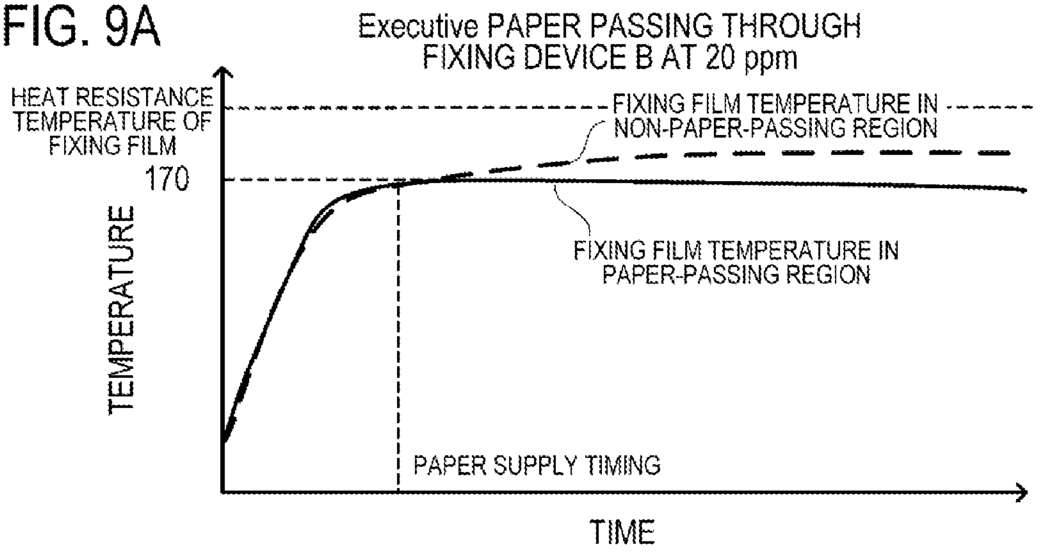
FIGS. 9A and 9B are diagrams showing the temperature transition of the fixing film of Embodiment 1.

FIG. 9A shows the temperature transition of the fixing film at this time. While the fixing film temperature in the paper passing region shown by the solid line is constant at 170° C. with the passage of time, the fixing film temperature in the non-passing region is affected by the non-image portion temperature rise. However, since the throughput is set to 20 ppm, the rate of temperature rise can be suppressed, so that the temperature can be suppressed to or below the heat resistance temperature of the fixing film.

Figure 9B:
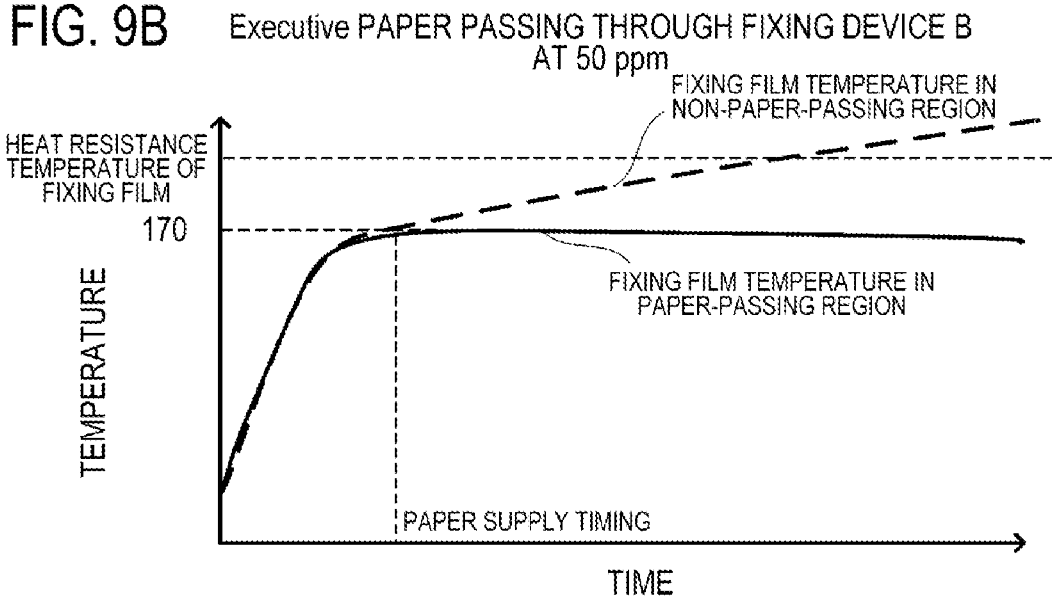

For example, FIG. 9B shows the temperature transition of the fixing film when printing on Executive paper at 50 ppm. In this case, since the throughput is high, the duration of paper interval is shortened, and the electric power that needs to be supplied to the paper per unit time is increased. Meanwhile, since the paper does not pass in the non-paper-passing region, the entire supplied electric power serves as energy for heating the fixing device, so that the fixing film temperature increases. Therefore, when the fixing device B is used for printing on small size paper, it is effective to lower the throughput.

Fixing Device Determination Method and Printing Operation

Figure 10:
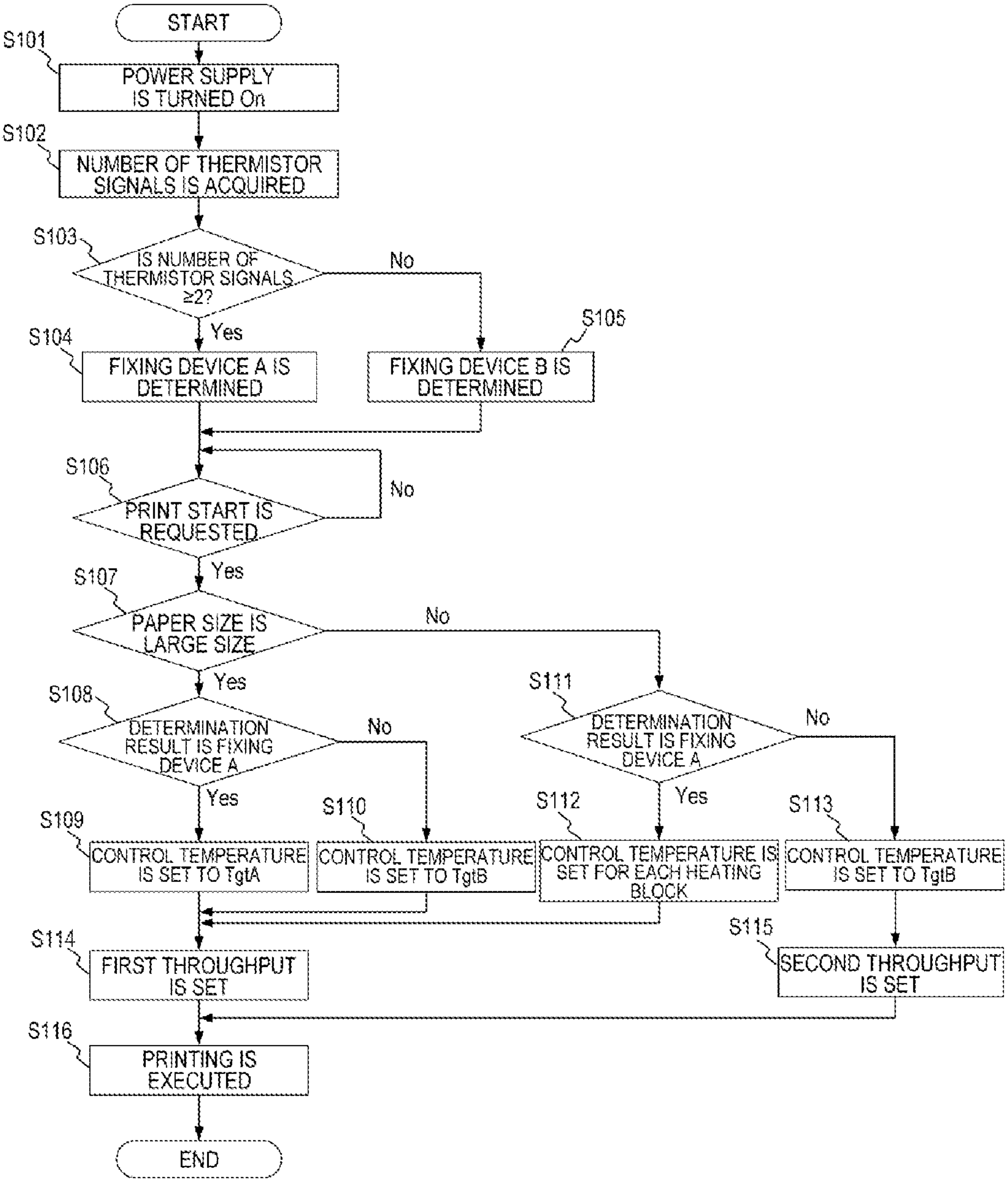
FIG. 10 is a control flow diagram of Embodiment 1.

FIG. 10 is a flowchart of a fixing device determination method and print control in the present embodiment. In S101, where the power supply of the image forming apparatus is turned on, an initialization operation of the image forming apparatus is started. During this initialization operation, the CPU 420, as a receiving portion, receives thermistor signals from the AD converter 423 in the fixing device through serial communication. Next, in S102, the CPU 420, as acquisition unit for acquiring the number of thermistors provided in the fixing unit mounted on the main body of the apparatus, analyzes digital information of the received thermistor signals and counts the number of thermistor signals.

The fixing device A and the fixing device B can be mounted on the image forming apparatus of the present embodiment, and the number of thermistors provided in each fixing device is different. Therefore, the number of thermistor signals transmitted from the AD converter 423 to the CPU 420 is different, which makes it possible to determine and identify the type of the fixing unit mounted on the apparatus main body, that is, which of the fixing device A and the fixing device B is mounted on the apparatus main body. Where the number of thermistor signals is two or more in S103, it is determined in S104 that the fixing device A has been mounted on the image forming apparatus. Meanwhile, where the number of thermistor signals is less than two in S103, it is determined in S105 that the fixing device B has been mounted on the image forming apparatus. The above operations are completed during the initialization operation of the image forming apparatus.

Next, when a print start request is generated in S106, a print condition is determined in S107. Where the print condition is large size paper in S107, the process proceeds to S108. In S108, where the fixing device A is found to be mounted based on the determination result of the fixing device mounted on the image forming apparatus, the control temperature is set to TgtA (220° C.) in S109. Meanwhile, where the determination result in S108 is the fixing device B, the control temperature is set to TgtB (200° C.) in S110. Next, where the print condition is small size paper in S107, the process proceeds to S111.

Where the result of determining the fixing device mounted on the image forming apparatus, which is obtained in S111, indicates that the fixing device A is mounted, in S112, the optimum control temperature is set for each heating block according to the paper size to be printed. In a specific example, the heating blocks HB2 to HB4, which are the paper passing portions, are set at 220° C., and the heating blocks HB1 and HB5, which are the non-paper-passing portions, are set at 180° C. Meanwhile, where the determination result in S111 is the fixing device B, the control temperature is set to TgtB (200° C.) in S113, and the throughput is set to 20 ppm, which is the second throughput, in S115. Also, where the transition has been made to any one of S109, S110, and S112, the throughput is set to 50 ppm, which is the first throughput, in S114. Finally, printing is executed in S116.

As described above, in the present embodiment, in an image forming apparatus on which a plurality of types of fixing devices can be mounted, good fixing performance can be obtained by changing temperature control of the heater and throughput control according to the fixing device mounted by the user. Further, by automatically determining the types of these fixing devices, printing can be executed by setting the optimum fixing control temperature and throughput according to the paper size set by the user. Furthermore, since the signals of the thermistors, which are essential parts of the fixing device, are used, there is no need for a dedicated device for determining the mounted fixing device.

In the present embodiment, in the control of the fixing operation of the fixing device A, the control according to the size of the recording material was exemplified, but the control by which the control target temperature for each heating block is adjusted according to the image information formed on the recording material may be performed as well. In such control, the temperature of the non-image portion where no image is formed is made lower than the temperature of the image portion. This control also makes it possible to suppress the temperature rise at the end portion and to suppress power consumption.

Also, in the present embodiment, two types of fixing units are illustrated as types of fixing units that can be mounted on the apparatus main body, but the number of types may be three or more. In such an image forming system in which a plurality of fixing units can be selectively replaced, the number of connection portions of the apparatus main body that are to be electrically connected to the thermistors of the fixing unit may be set to be at least equal to the largest number of thermistors provided in one fixing unit as shown in FIG. 7.

Embodiment 2

On the image forming apparatus according to Embodiment 2 of the present invention, a plurality of types of fixing devices having different configurations can be mounted, and in the present embodiment, a specific thermistor signal is used for determining the mounted fixing device. Further, the fixing device A shown in FIG. 2 and the fixing device B shown in FIG. 4 can be mounted on the image forming apparatus of Embodiment 2 as in Embodiment 1. Also, the configurations of the image forming apparatus, the fixing devices, and the heater in Embodiment 2 are the same as those in Embodiment 1, and the description thereof will be omitted.

Structure of Heater Control Circuit

Figure 11:
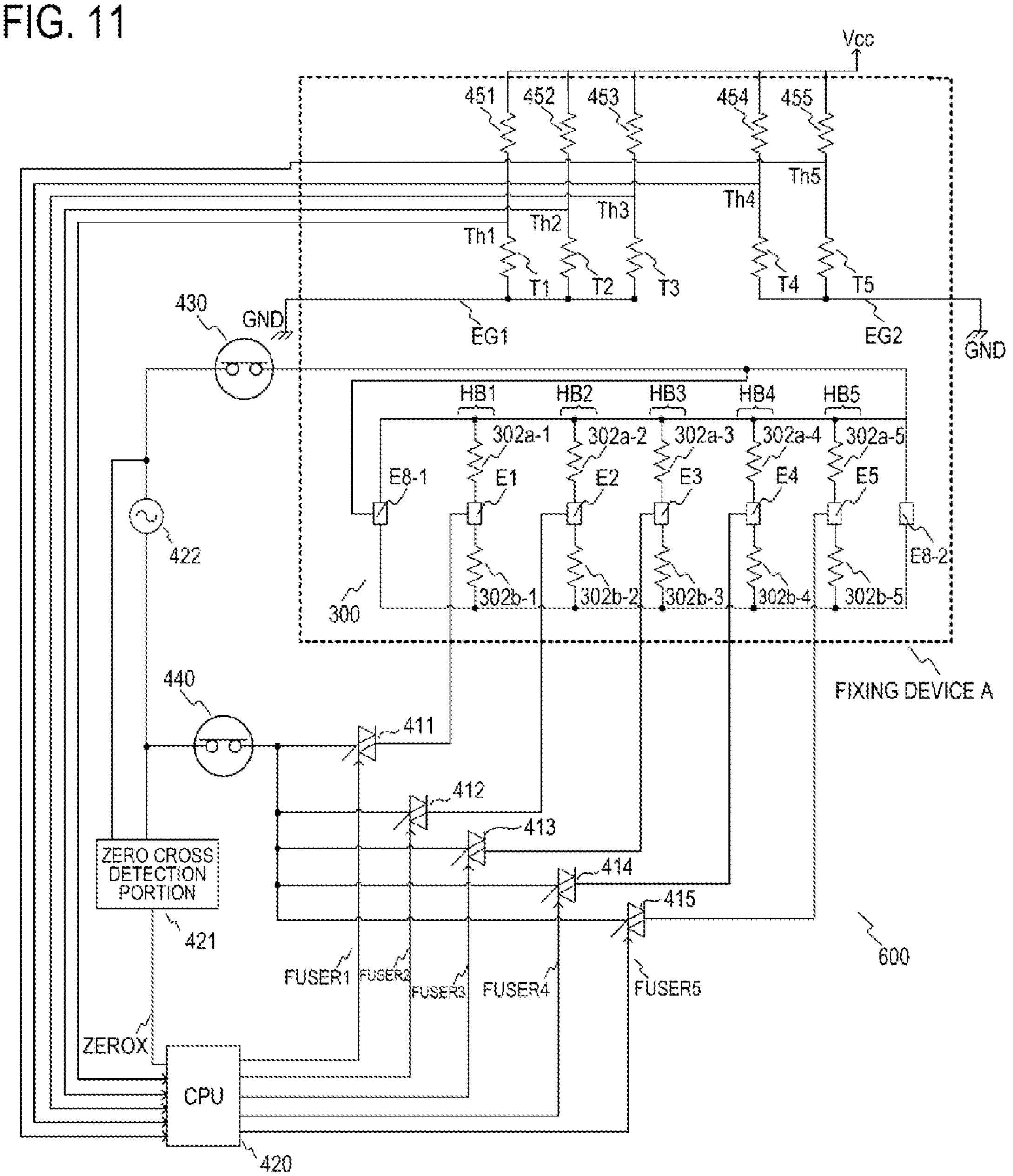
FIG. 11 is an electric circuit configuration diagram of Embodiment 2.

FIG. 11 is a circuit diagram of the control circuit of the fixing device in the present embodiment, this circuit diagram relating to the case where the fixing device A is mounted on the image forming apparatus. A portion surrounded by a dashed line in FIG. 11 shows a circuit diagram of the fixing device A.

The difference from Embodiment 1 is in the method of detecting the temperature of the heater 300, and the rest of the circuit configuration is the same as that of Embodiment 1, so the description thereof will be omitted. The temperatures detected by the thermistors T1 to T5 are represented by divided voltages of thermistors T1 to T5 and resistors 451 to 455 that are directly communicated as Th1 to Th5 signals to the CPU 420. That is, the CPU 420 is individually connected to a plurality of thermistors T1 to T5 provided in the fixing device A, thereby forming a plurality of temperature detection circuits corresponding to the individual thermistors. The output values of the thermistors T1 to T5 are individually output to the CPU 420 via the plurality of temperature detection circuits. The CPU 420 discretizes the Th1 to Th5 analog voltage signals, converts the analog voltage signals into digital signals, and uses the digital signals for calculation of temperature control of the heater 300.

Figure 12:
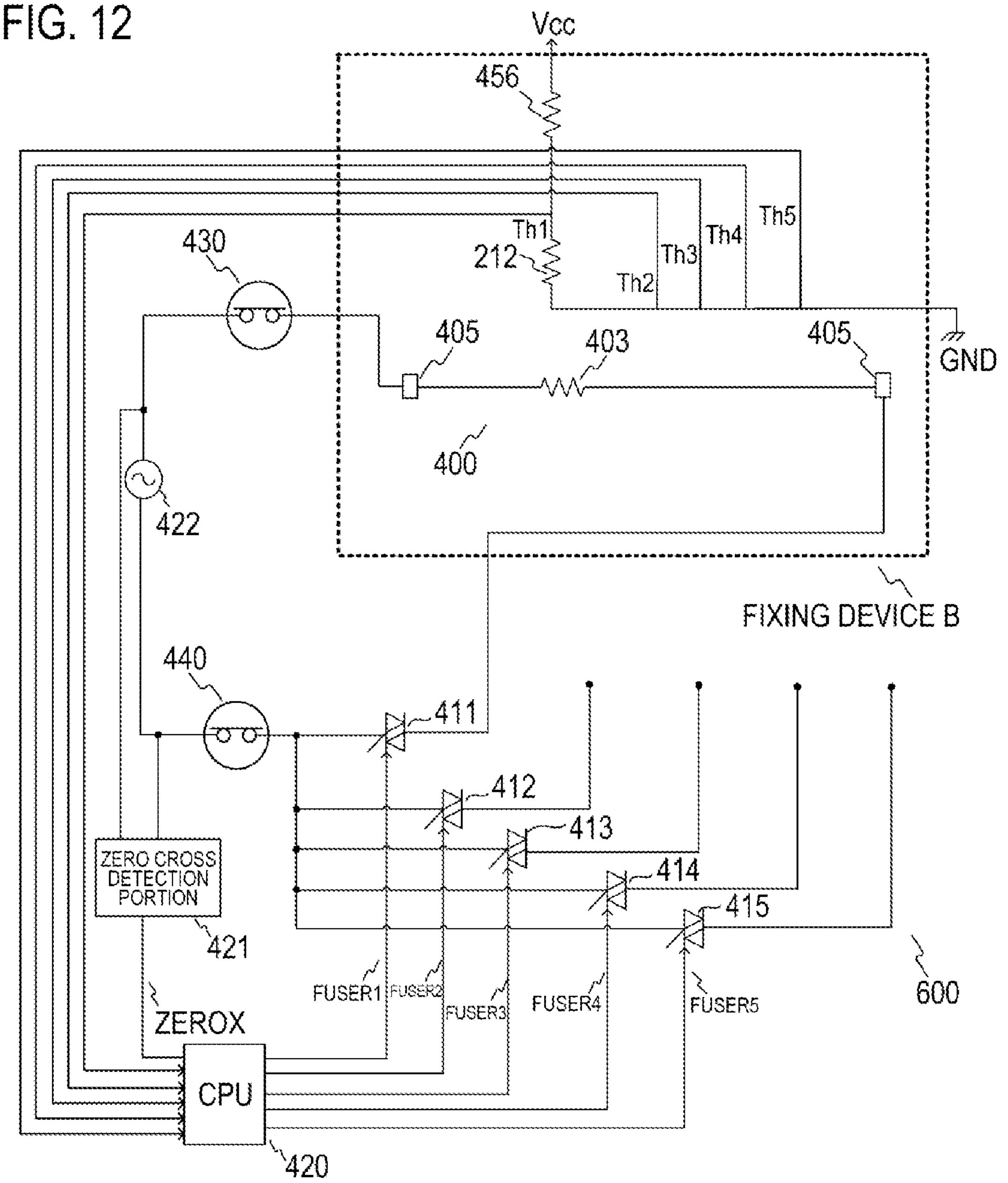
FIG. 12 is an electric circuit configuration diagram of Embodiment 2.

FIG. 12 is a circuit diagram of the control circuit of the fixing device in the present embodiment, this circuit diagram relating to the case where the fixing device B is mounted on the image forming apparatus. A portion surrounded by a dashed line in FIG. 12 shows a circuit diagram of the fixing device B.

The difference from Embodiment 1 is in the method of detecting the temperature of the heater 400, and the rest of the circuit configuration is the same as that of Embodiment 1, so the description thereof will be omitted. The temperature detected by the thermistor 212 is represented by the divided voltage of the thermistor 212 and the resistor 456 as a Th1 signal and is directly communicated to the CPU 420, with Th2 to Th5 being grounded. That is, a first temperature detection circuit connected to the thermistor 212 provided in the fixing device B, and a second temperature detection circuit which does not have a temperature detection element to be connected and outputs a value corresponding to the ground potential are formed in the CPU 420. The CPU 420 discretizes the Th1 to Th5 analog voltage signals, converts the analog voltage signals into digital signals, and uses the digital signals for calculation of temperature control of the heater 400. Since the Th2 to Th5 signals are grounded, the CPU 420 detects them as 0 [V]. Further, since the thermistor of the present embodiment has an NTC characteristic, the resistance of the thermistor 212 decreases as the temperature of the heater 400 increases. Therefore, since the resistor 456 (fixed value) and the thermistor 212 are connected in series in the circuit of FIG. 12, the potential of Th1 decreases as the temperature of the heater 400 increases.

Fixing Device Determination Method

When the fixing device A is mounted on the image forming apparatus of the present embodiment, the resistance values of the thermistors T1 to T5 are greater than 0 [Ω] regardless of the temperature of the heater 300, so the potentials of Th1 to Th5 have values greater than 0 [V]. Meanwhile, when the fixing device B is mounted, the resistance value of the thermistor 212 is greater than 0 [Ω] regardless of the temperature of the heater 400, so the potential of Th1 has a value greater than 0 [V]. However, since Th2 to Th5 are grounded, the potential thereof is 0 [V]. Therefore, when the potential of any one of the Th2 to Th5 signals is 0 [V] in the CPU 420, it can be determined that the fixing device B is mounted on the image forming apparatus. Meanwhile, when the potentials of the Th2 to Th5 signals are all higher than 0 [V] in the CPU 420, it can be determined that the fixing device A is mounted.

Figure 13:
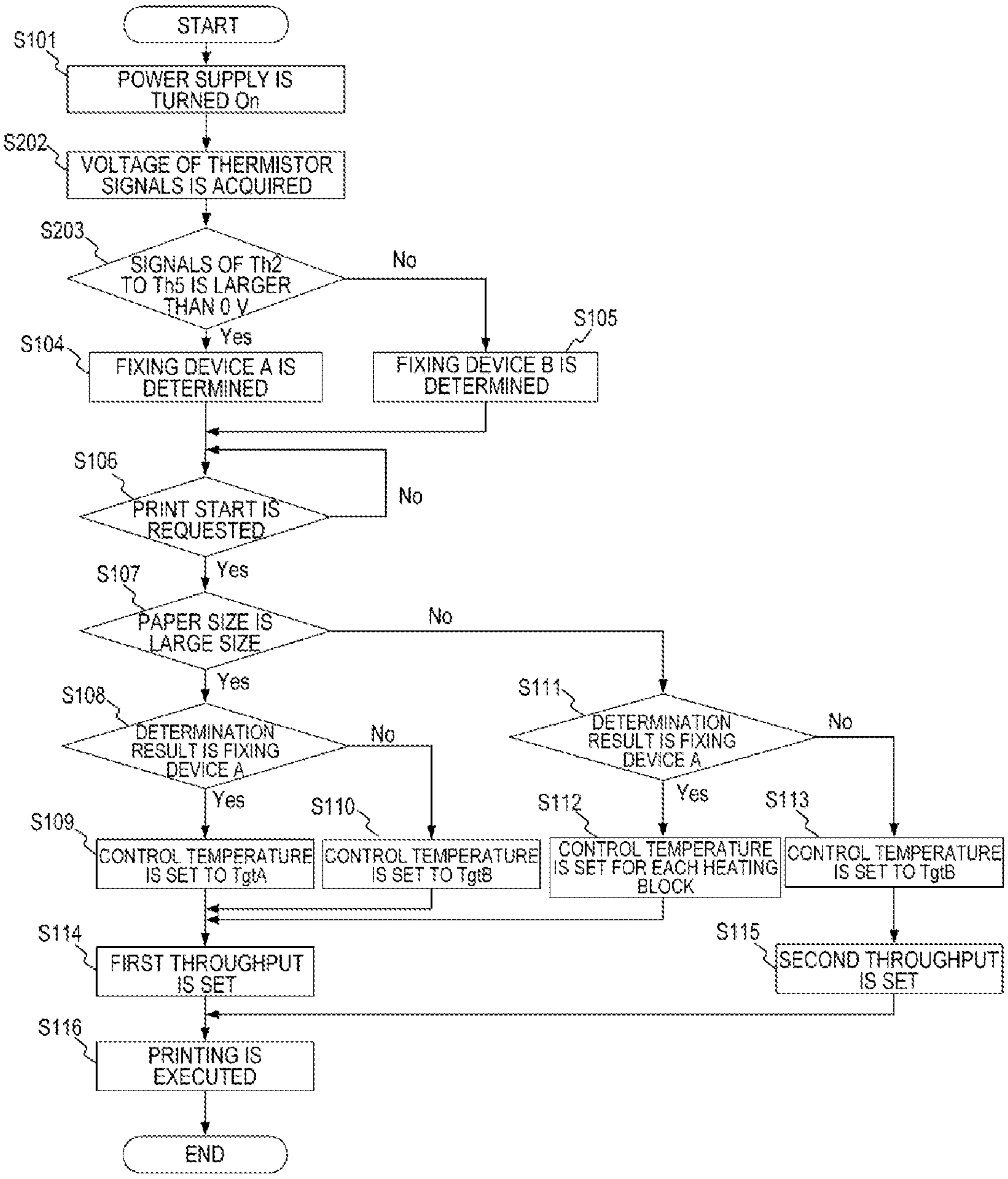
FIG. 13 is a control flow diagram of Embodiment 2.

FIG. 13 is a flowchart of a fixing device determination method and print control in the present embodiment. In S101, where the power supply of the image forming apparatus is turned on, an initialization operation of the image forming apparatus is started. During this initialization operation, in S202, the CPU 420 acquires the voltage of the signals of the thermistors connected to the fixing device. Next, where all of the Th2 to Th5 signals among the acquired thermistor signals are greater than 0 [V] in S203, the CPU 420 determines in S104 that the mounted fixing device is the fixing device A. Meanwhile, where all of the Th2 to Th5 signals are 0 [V] in S203, it is determined in S105 that the fixing device B is mounted on the image forming apparatus. The above operations are completed during the initialization operation of the image forming apparatus. Since the flowchart after this is the same as that of Embodiment 1, the explanation thereof is omitted.

As described above, in the present embodiment, in an image forming apparatus on which a plurality of types of fixing devices can be mounted, the fixing device mounted by the user is automatically determined, and printing can be executed by setting the optimum fixing control temperature and throughput according to the paper size set by the user. Furthermore, since the signals of the thermistors, which are essential parts of the fixing device, are used, there is no need for a dedicated device for determining the mounted fixing device.

Embodiment 3

In Embodiment 3 of the present invention, the difference in the rate of temperature increase detected by the thermistor when the heater is heated is used for determining the mounted fixing device. Further, the fixing device A shown in FIG. 2 and the fixing device B shown in FIG. 4 can be mounted on the image forming apparatus of Embodiment 3 as in Embodiment 1. Also, the configurations of the image forming apparatus, the fixing devices, and the heater in Embodiment 3 are the same as those in Embodiment 1, and the description thereof will be omitted.

Figure 14:
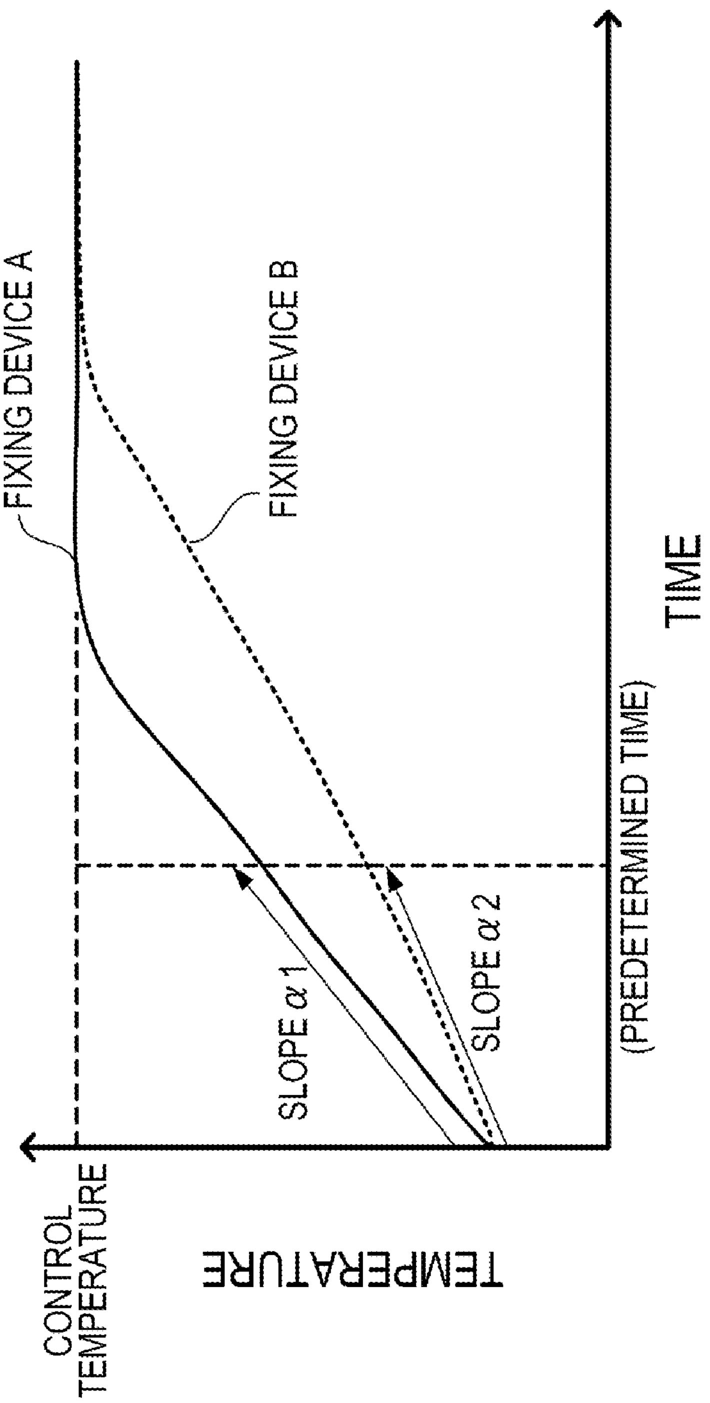
FIG. 14 is a diagram showing the temperature transition of the heater of Embodiment 3.
Figure 15:
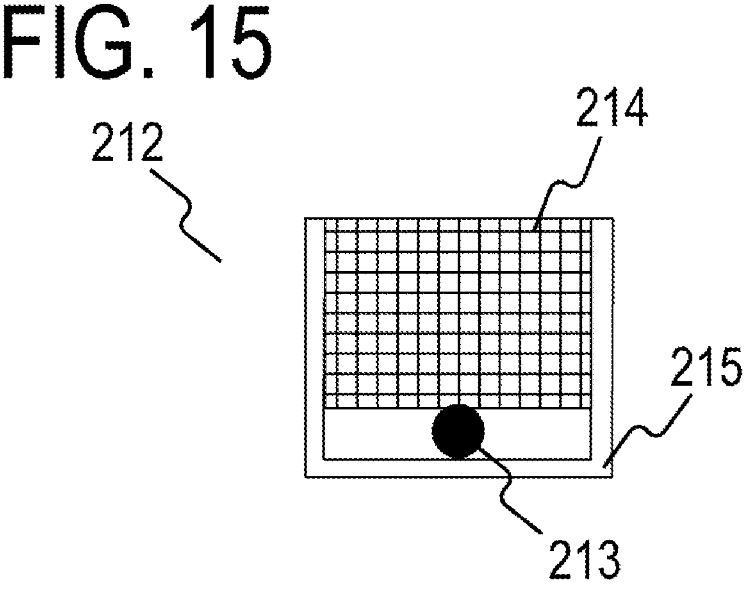
FIG. 15 is a detailed diagram of the temperature detection element of Embodiment 3.

FIG. 14 shows temperature profiles detected by respective thermistors when the heater 300 of the fixing device A and the heater 400 of the fixing device B are supplied with constant power. Where the temperature of the heater reaches the control temperature from room temperature after a constant power is supplied, a transition is made to PI control. Further, although the electric power supplied to the fixing device A and the fixing device B is the same, the temperature detected by the thermistors of the fixing device A has a higher rate of temperature rise. The reason for this is explained hereinbelow. The thermistors of the fixing device A are thermistors T1 to T5 shown in FIG. 3B which are printed to a thickness of 10 μm and a width 1 mm by screen printing on the ceramic substrate 305. Therefore, since the thermistors T1 to T5 have very small heat capacities, the thermistors are highly sensitive to changes in temperature, and the thermal response can be sped up. FIG. 15 shows a detailed cross-sectional view of the thermistor 212 of the fixing device B. The thermistor 212 is configured of a temperature-sensing thermistor element 213, ceramic paper 214 for holding the thermistor element 213, and a polyimide film 215 as a surface protective layer. Further, the thermistor element 213 has a diameter of about 1 mm and has a larger value of heat capacity than the thermistors T1 to T5. Therefore, the thermal response of the thermistor 212 is slightly delayed. Due to the difference in thermal response between the thermistors T1 to T5 and the thermistor 212, the rate of temperature rise differs as shown in FIG. 14. In the present embodiment, when the power supplied to the fixing device is 900 [W], the slope α1 of the temperature rise of the fixing device A is 135 (° C./sec), and the slope α2 of the temperature rise of the fixing device B is 117 (° C./sec).

Fixing Device Determination Method

In the present embodiment, the temperature detected by the thermistor is used to determine the type of the mounted fixing device from the difference in the rate of temperature rise when constant power is supplied to the heater. As an initial operation when the power supply of the image forming apparatus is turned on, constant power is supplied to the heater. Thereafter, the temperature of each thermistor is detected after a predetermined time has passed, and where the temperature is equal to or higher than a predetermined threshold value, it can be determined that the fixing device A is mounted. Meanwhile, where the temperature is less than the predetermined threshold, it can be determined that the fixing device B is mounted.

Figure 16:
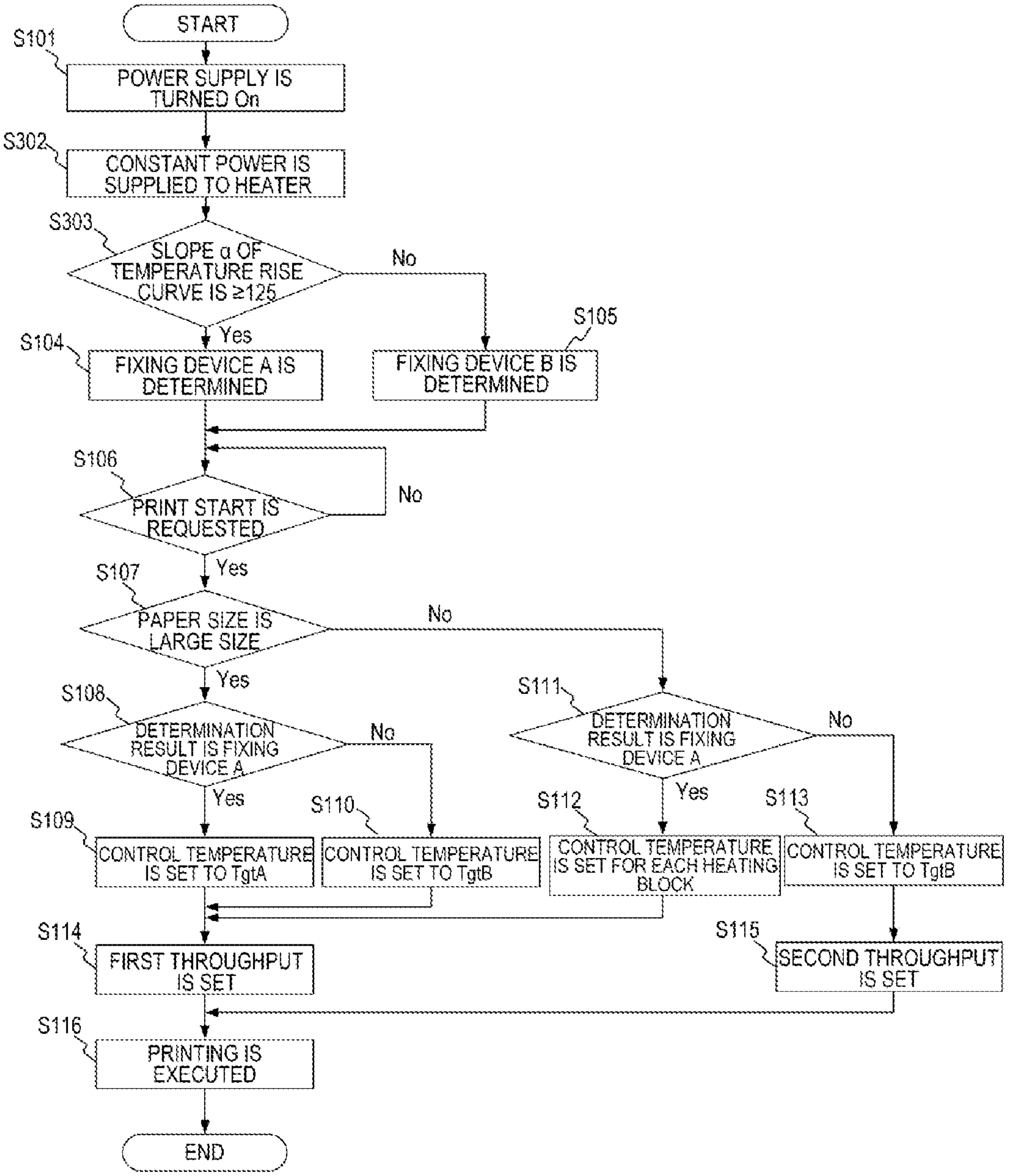
FIG. 16 is a control flow diagram of Embodiment 3.

FIG. 16 is a flowchart of a fixing device determination method and print control in the present embodiment. In S101, where the power supply of the image forming apparatus is turned on, an initialization operation of the image forming apparatus is started. During this initialization operation, constant electric power (900 [W]) is supplied to the heater in S302. Next, in S303, the slope α of the temperature rise curve is calculated from the initial temperature of the thermistor when the power supply is turned on and the temperature of the thermistor after a predetermined time has elapsed since the power was supplied to the heater. Where the slope α is equal to or greater than 125 (° C./sec) as a predetermined threshold value of the rate of temperature rise, it is determined in S104 that the mounted fixing device is the fixing device A. Meanwhile, where the slope α is less than 125 (° C./sec) in S303, it is determined in S105 that the fixing device B is mounted on the image forming apparatus. The above operations are completed during the initialization operation of the image forming apparatus. Since the flowchart after this is the same as that of Embodiment 1, the explanation thereof is omitted.

As described above, in the present embodiment, in an image forming apparatus on which a plurality of types of fixing devices can be mounted, the fixing device mounted by the user is automatically determined, and printing can be executed by setting the optimum fixing control temperature and throughput according to the paper size set by the user. Furthermore, since the signals of the thermistors, which are essential parts of the fixing device, are used, there is no need for a dedicated device for determining the mounted fixing device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-029693, filed on Feb. 28, 2022, which is hereby incorporated by reference herein in its entirety.

What is claimed is:

1. An image forming system comprising:

an apparatus main body equipped with an image forming portion that forms an image on a recording material; and a control portion that controls a fixing operation of fixing the image formed on the recording material, wherein a first fixing unit having a first heater and a second fixing unit having a second heater different from the first heater can be selectively mounted on the apparatus main body, wherein the first fixing unit has a first number of first temperature detection elements that detect the temperature of the first heater, wherein the second fixing unit has a second number of second temperature detection elements that detect the temperature of the second heater, the second number being smaller than the first number, wherein the control portion controls the fixing operation on the basis of first temperature information detected by the first temperature detection elements in a case where the first fixing unit is mounted, controls the fixing operation on the basis of second temperature information detected by the second temperature detection elements in a case where the second fixing unit is mounted, and controls the fixing operation so that a number of recording materials passing per unit time among the plurality of recording materials passing through a fixing unit differs between the case where the first fixing unit is mounted on the apparatus main body and the case where the second fixing unit is mounted on the apparatus main body, wherein the first heater has a plurality of heating blocks that are divided in a width direction perpendicular to a conveyance direction of the recording material, heat generation in each heating block being independently controllable, and wherein the second heater has a single heating block corresponding to the size of the recording material of the largest size in the width direction.

2. The image forming system according to claim 1, wherein, in the case where the first fixing unit is mounted on the apparatus main body, the control portion sets a control target temperature in the fixing operation individually for each of the plurality of heating blocks according to the size in the width direction of the recording material which is to pass through the first fixing unit.

3. The image forming system according to claim 1, wherein, in the case where the first fixing unit is mounted on the apparatus main body and the recording material of the largest size is to pass through the first fixing unit, the control portion sets a control target temperature in the fixing operation to a same temperature for each of the plurality of heating blocks.

4. The image forming system according to claim 1, wherein, in a case where the recording material of the largest size is to pass through the fixing unit mounted on the apparatus main body, the control portion sets a control target temperature in the fixing operation that is set in a case where the first fixing unit is mounted on the apparatus main body to a temperature higher than the control target temperature that is set in a case where the second fixing unit is mounted on the apparatus main body.

5. The image forming system according to claim 1 wherein, in the case where the first fixing unit is mounted on the apparatus main body and a recording material having a size smaller than that of the recording material of the largest size is to pass through the first fixing unit, the control portion sets a control target temperature of first heating blocks, which are arranged at respective ends of the first heater in the width direction, among the plurality of heating blocks, to a temperature lower than a control target temperature of second heating blocks arranged on an inner side of the first heater in the width direction with respect to the first heating blocks.

6. The image forming system according to claim 5, wherein, in the case where the first fixing unit is mounted on the apparatus main body, the control portion sets the control target temperature of the first heating blocks that is set in a case where the recording material of the largest size is to pass through the first fixing unit to a higher temperature than the control target temperature of the first heating blocks that is set in a case where the recording material having a size smaller than that of the recording material of the largest size is to pass through the first fixing unit.

7. The image forming system according to claim 5, wherein, in the case where the first fixing unit is mounted on the apparatus main body, the control portion sets the control target temperature of the second heating blocks that is set in a case where the recording material having a size smaller than that of the recording material of the largest size is to pass through the first fixing unit to a same temperature as the control target temperature of the second heating blocks that is set in a case where the recording material of the largest size is to pass through the first fixing unit.

8. The image forming system according to claim 1, wherein, in the case where the second fixing unit is mounted on the apparatus main body and the recording material having a size smaller than that of the recording material of the largest size is to pass through the second fixing unit, the control portion sets a control target temperature that is set in the second fixing unit to a temperature that is higher than the control target temperature set in the first heating blocks in the first fixing unit and lower than the control target temperature set in the second heating blocks in the first fixing unit.

9. The image forming system according to claim 1, wherein the first heater has a plurality of heating blocks that are divided in a width direction perpendicular to the conveyance direction of the recording material, heat generation in each heating block being independently controllable, wherein the second heater has a single heating block corresponding to the size of the recording material of the largest size in the width direction, wherein, in the case where the second fixing unit is mounted on the apparatus main body, the control portion sets the number of recording materials passing per unit time that is set in a case where the recording material having a size smaller than that of the recording material of the largest size is to pass through the second fixing unit to a number smaller than the number of recording materials passing per unit time that is set in a case where the recording material of the largest size is to pass through the second fixing unit.

10. The image forming system according to claim 1, wherein the first fixing unit comprises:

a first film, and a first pressure roller forming a nip portion together with the first film, the first heater is arranged in an internal space of the first film, and the first film is nipped by the first heater and the first pressure roller, and an image formed on the recording material is heated through the first film in the nip portion formed between the first film and the first pressure roller, and wherein the second fixing unit comprises a second film, and a second pressure roller forming a nip portion together with the second film, the second heater is arranged in an internal space of the second film, and the second film is nipped by the second heater and the second pressure roller, and an image formed on the recording material is heated through the second film in the nip portion formed between the second film and the second pressure roller.

* * * * *